United States Patent
Choi

(10) Patent No.: US 7,586,991 B2
(45) Date of Patent: Sep. 8, 2009

(54) METHOD AND APPARATUS FOR CALCULATING LIKELIHOOD METRIC OF A RECEIVED SIGNAL IN A DIGITAL COMMUNICATION SYSTEM

(75) Inventor: Joonsang Choi, Seoul (KR)

(73) Assignee: Posdata Co., Ltd., Seongnam-si, Kyeonggi-do (KR)

( * ) Notice: Subject to any disclaimer, the term of this patent is extended or adjusted under 35 U.S.C. 154(b) by 580 days.

(21) Appl. No.: 11/378,792

(22) Filed: Mar. 16, 2006

(65) Prior Publication Data
US 2007/0217536 A1   Sep. 20, 2007

(51) Int. Cl.
H04L 23/02 (2006.01)
H03D 1/00 (2006.01)
H03M 13/03 (2006.01)

(52) U.S. Cl. .......... 375/262; 375/341; 714/794

(58) Field of Classification Search .......... 375/136, 375/148, 316, 261–262, 341, 235, 299; 704/242; 714/794–796; 369/59.22
See application file for complete search history.

(56) References Cited

U.S. PATENT DOCUMENTS

| | | | | |
|---|---|---|---|---|
| 6,377,607 | B1 * | 4/2002 | Ling et al. | 375/130 |
| 7,231,005 | B2 * | 6/2007 | Eidson et al. | 375/341 |
| 2003/0112901 | A1 * | 6/2003 | Gupta | 375/340 |
| 2006/0203943 | A1 * | 9/2006 | Scheim et al. | 375/341 |

* cited by examiner

Primary Examiner—Tesfaldet Bocure
Assistant Examiner—Lawrence B Williams
(74) Attorney, Agent, or Firm—Fenwick & West LLP

(57) ABSTRACT

A likelihood metric calculation method including: estimating a channel of a received signal and generating a channel estimate; compensating a channel of the received signal according to the channel estimate; calculating a region variable according to the channel estimate; and comparing the region variable and a magnitude of the compensated received signal and calculating a likelihood metric of the received signal according to a result of the comparison. An apparatus for calculating a likelihood metric including: a channel estimation unit estimating a channel of the received signal and generating a channel estimate; a channel compensation unit compensating a channel of the received signal according to the channel estimate; a region variable calculation unit calculating a region variable according to the channel estimate, the region variable being a value obtained by scaling a symbol coordinate value in a signal constellation corresponding to the received signal utilizing the channel estimate; a comparison unit comparing a magnitude of the compensated received signal and the region variable; and a bit metric calculation unit calculating a likelihood metric with respect to each bit of the compensated received signal according to a result of the comparison. According to the present invention, it is possible to reduce a complexity in the compensating of the channel and the calculating of the likelihood metric. Also, since effects caused by the channel variation are reflected as a weighting factor in the calculating of the likelihood metric, it is possible to improve a message detection performance of the entire system.

17 Claims, 13 Drawing Sheets

○ LOCATION OF 64QAM SYMBOL IN SIGNAL CONSTELLATION
● QAM RECEIVED SIGNAL

METHOD AND APPARATUS FOR CALCULATING LIKELIHOOD METRIC OF A RECEIVED SIGNAL IN A DIGITAL COMMUNICATION SYSTEM

BACKGROUND OF THE INVENTION

1. Field of the Invention

The present invention relates to a method of detecting a message from a received signal in a digital communication system, and more particularly, to a method and apparatus of calculating a likelihood metric of a modulated digital signal.

2. Description of Related Art

In a digital communication system, each symbol constituting a message goes through a modulation process before its transmission. Modulation, as used here, has a broader meaning of a process converting a digital signal into a form which can be transmitted in a channel. The modulation is performed by loading a digital signal onto a carrier or a plurality of carriers. This is to give a certain variation to the carrier according to a digital value of the digital signal and to enable a receiving end to restore the original digital signal from the modulated signal based on the information of a modulation scheme.

Examples of digital modulation schemes include amplitude shift keying (ASK), phase shift keying (PSK) and frequency-shift keying (FSK). ASK changes an amplitude of a carrier signal according to a value of digital data. While ASK has a simple structure, a receiving end may not distinguish the difference in a signal level in an environment where a signal to noise ratio is low.

PSK and FSK have a better performance than ASK. PSK and FSK for representing binary data are referred to as binary PSK (BPSK) and binary FSK (BFSK). BPSK gives variation to a phase of a carrier by utilizing a binary symbol represented as '0' and '1'. Namely, BPSK gives a variation to a carrier signal transmitted in a channel by changing a phase of a carrier by 180 degrees when a data value to be transmitted is changed from '0' to '1' or from '1' to '0', On the other hand, BFSK utilizes a frequency, not a phase. Namely, BFSK utilizes two carriers represented as sinusoidal waves of respectively different frequencies, in order to indicate '0' and '1'.

However, BPSK and BFSK do not effectively utilize a frequency band. This is because BPSK represents only two signals with one carrier, and BFSK needs a frequency band which increases in proportion to a number of carrier signals. To solve the aforementioned problem, quadrature PSK (QPSK) is utilized as a modulation scheme. QPSK transmits four levels of data by altering a phase of the carrier into 4 different values having a 90 degree interval.

In a digital modulation, basic modulation schemes may be employed in combination. In particular, a modulation scheme based on changing both an amplitude and a phase is called quadrature amplitude modulation (QAM). QAM may produce signals of which amplitudes are identical but phases are different, signals of which phases are identical but amplitudes are different, and signals of which both phases and amplitudes are different. 16QAM, 64QAM and 256QAM are representative examples of QAM, and may represent 16, 64 and 256 different data values, respectively.

With respect to the modulated signal as described above, a receiving end restores an original message through processes of demodulation and detection. The demodulation is a restoration of a signal, while the detection is a process of detecting a digital value of the signal. In the case of BPSK and BFSK, detection of a message is relatively easy, for it only requires determining whether a value of received data corresponds to '0' or '1'. However, in the case of QPSK or QAM, it is not easy to detect messages, because a large number of data symbols are densely allocated in a limited frequency band.

Accordingly, in this case, it is not clearly determined whether received data correspond to '0' or '1'. Instead, a likelihood that an originally transmitted bit value of a received signal is '0' or '1' is determined. The determination method described above is called as a soft decision. In this instance, a detector output is called as a soft bit. More particularly, the soft decision is performed by calculating a likelihood metric of each bit. The likelihood metric is a value indicating a likelihood that a particular signal may have been transmitted with respect to a received signal.

FIG. 1 is a flowchart illustrating a conventional method of receiving a signal transmitted from a digital communication system.

As illustrated in FIG. 1, in operation 110, a receiving end converts a received signal to a frequency domain by using a fast Fourier transform (FFT) module. In operation 120, the receiving end calculates a channel estimate from the received signal in a frequency domain, the channel estimate is a value that the characteristic of a channel is estimated. In operation 130, the receiving end compensates a distortion of the received signal based on the channel estimate. In operation 140, the receiving end calculates a likelihood metric of the compensated received signal. In operation 150, the receiving end decodes data, which was encoded in a transmitting end, based on the calculated likelihood metric. As a final step, the receiving end detects an original message. As described above, calculating of the likelihood metric is performed before detecting the message. Accordingly, a performance of the likelihood metric calculation becomes an important factor in determining a performance of the message detection.

Hereinafter, a technical field where the present invention belongs, which is the conventional art of a likelihood metric calculation method, will be described in detail by taking an example of 16QAM and 64QAM.

FIGS. 2 and 3 are diagrams illustrating locations of message symbols included in 16QAM and 64QAM signals in a signal constellation. The conventional likelihood metric calculation method with respect to the modulated signal is characterized by calculating a complex distance between each symbol and a received signal in the signal constellation of FIGS. 2 and 3.

When $C_k$, which is a transmitted signal with respect to a $k^{th}$ symbol, passes through a channel having the characteristic of $h_k$ and is received with a noise component $n_k$ added, a received signal $y_k$ is represented as, $$y_k = h_k C_k + n_k \quad \text{[Equation 1]}$$

If a receiving end can perfectly estimate a channel, a distortion caused by the channel may be compensated by multiplying the received signal and a complex conjugate of a channel estimate. The compensated received signal $r_k$, calculated according to the above mentioned method and normalized by a square of an absolute value of the channel estimate, is represented as, $$r_k = \frac{h_k^* h_k}{|h_k|^2} C_k + \frac{h_k^*}{|h_k|^2} n_k = C_k + \hat{n}_k = r_{x,k} + j r_{y,k} \quad \text{[Equation 2]}$$

As is already known to those skilled in the related art, each symbol of 16QAM consists of four bits. A likelihood with respect to each symbol bit is represented as a random variable having a Gaussian distribution in an additive white Gaussian noise (AWGN) environment. In this instance, the AWGN environment is utilized for modeling a thermal noise of a general system. As an example, when a transmitting end transmits a bit corresponding to a value of either a '0' or '1', a likelihood of a $1^{st}$ bit is represented as, $$L_k(b_1 \mid 1) = \left\{ \frac{1}{\sqrt{\pi\sigma_{\hat{n}}^2}} \exp\left(-\frac{\left(r_{y,k} + \frac{1}{\sqrt{10}}\right)^2}{\sigma_{\hat{n}}^2}\right) + \frac{1}{\sqrt{\pi\sigma_{\hat{n}}^2}} \exp\left(-\frac{\left(r_{y,k} + \frac{3}{\sqrt{10}}\right)^2}{\sigma_{\hat{n}}^2}\right) \right\},$$

$$L_k(b_1 \mid 0) = \left\{ \frac{1}{\sqrt{\pi\sigma_{\hat{n}}^2}} \exp\left(-\frac{\left(r_{y,k} - \frac{1}{\sqrt{10}}\right)^2}{\sigma_{\hat{n}}^2}\right) + \frac{1}{\sqrt{\pi\sigma_{\hat{n}}^2}} \exp\left(-\frac{\left(r_{y,k} - \frac{3}{\sqrt{10}}\right)^2}{\sigma_{\hat{n}}^2}\right) \right\}.$$

[Equation 3]

In this instance, $\sigma_n^2$ indicates a noise variance, and $L_k(b_1 \mid 0)$ indicates a likelihood when the transmitting end transmits '0' with respect to the $1^{st}$ bit-of the $k^{th}$ symbol. The ratio of $L_k(b_1 \mid 0)$ and $L_k(b_1 \mid 1)$ is referred to as a log likelihood ratio (LLR).

A method of calculating an LLR with respect to a $k^{th}$ symbol bit by using a likelihood value of each transmission bit data, which is shown in Equation 3, is represented as, $$LLR_k(b_1) = \log\frac{L_k(b_1 \mid 0)}{L_k(b_1 \mid 1)} \quad \text{[Equation 4]}$$

In the conventional art, a likelihood of the each bit is calculated on the basis of a distance between each symbol and the received signal in the signal constellation of FIG. 2. The LLR is calculated by using the likelihood value calculated as above and represented as, $$LLR_k(b_1) \cong \max\left(-\frac{\left(r_{y,k} - \frac{1}{\sqrt{10}}\right)^2}{\sigma_{\hat{n}}^2}, -\frac{\left(r_{y,k} - \frac{3}{\sqrt{10}}\right)^2}{\sigma_{\hat{n}}^2}\right) -$$

$$\max\left(-\frac{\left(r_{y,k} + \frac{1}{\sqrt{10}}\right)^2}{\sigma_{\hat{n}}^2}, -\frac{\left(r_{y,k} + \frac{3}{\sqrt{10}}\right)^2}{\sigma_{\hat{n}}^2}\right) =$$

$$\min\left(\frac{\left(r_{y,k} + \frac{1}{\sqrt{10}}\right)^2}{\sigma_{\hat{n}}^2}, \frac{\left(r_{y,k} + \frac{3}{\sqrt{10}}\right)^2}{\sigma_{\hat{n}}^2}\right) -$$

$$\min\left(\frac{\left(r_{y,k} - \frac{1}{\sqrt{10}}\right)^2}{\sigma_{\hat{n}}^2}, \frac{\left(r_{y,k} - \frac{3}{\sqrt{10}}\right)^2}{\sigma_{\hat{n}}^2}\right) =$$

$$\min(D_{q2}, D_{q3}) - \min(D_{q0}, D_{q1})$$

[Equation 5]

In this instance, $$D_{qe} = |r_{y,k} - l|^2 \text{ and } D_{ie} = |r_{x,k} - l|^2, \text{ with } e = 0; l = \frac{3}{\sqrt{10}},$$

$$e = 1; l = \frac{1}{\sqrt{10}}, e = 2; l = -\frac{1}{\sqrt{10}}, e = 3; l = -\frac{3}{\sqrt{10}}.$$

When the same method is applied to other bits, a method of calculating an LLR for each bit of a 16QAM received signal may be represented as, $$LLR_k(b_0) = \min(D_{q0}, D_{q3}) - \min(D_{q1}, D_{q2})$$

$$LLR_k(b_1) = \min(D_{q2}, D_{q3}) - \min(D_{q0}, D_{q1})$$

$$LLR_k(b_2) = \min(D_{i0}, D_{i3}) - \min(D_{i1}, D_{i2})$$

$$LLR_k(b_3) = \min(D_{i2}, D_{i3}) - \min(D_{i0}, D_{i1}) \quad \text{[Equation 6]}$$

When the same method is applied to a 64QAM signal, an LLR for each bit of the 6 bits constituting the 64QAM signal may be obtained by, $$LLR_k(b_0) = \min(D_{q0}, D_{q3}, D_{q4}, D_{q7}) - \min(D_{q1}, D_{q2}, D_{q5}, D_{q6})$$

$$LLR_k(b_1) = \min(D_{q0}, D_{q1}, D_{q6}, D_{q7}) - \min(D_{q2}, D_{q3}, D_{q4}, D_{q5})$$

$$LLR_k(b_2) = \min(D_{q4}, D_{q5}, D_{q6}, D_{q7}) - \min(D_{q0}, D_{q1}, D_{q2}, D_{q3})$$

$$LLR_k(b_3) = \min(D_{i0}, D_{i3}, D_{i4}, D_{i7}) - \min(D_{i1}, D_{i2}, D_{i5}, D_{i6})$$

$$LLR_k(b_4) = \min(D_{i0}, D_{i1}, D_{i6}, D_{i7}) - \min(D_{i2}, D_{i3}, D_{i4}, D_{i5}) \quad \text{[Equation 7]}$$

In this instance, $$D_{qe} = |r_{y,k} - l|^2 \text{ and } D_{ie} = |r_{x,k} - l|^2, \text{ with } e = 0; l = \frac{7}{\sqrt{42}}, e = 1;$$

$$l = \frac{5}{\sqrt{42}}, e = 2; l = \frac{3}{\sqrt{42}}, e = 3; l = \frac{1}{\sqrt{42}}, e = 4; l = -\frac{1}{\sqrt{42}},$$

$$e = 5; l = -\frac{3}{\sqrt{42}}, e = 6; l = -\frac{5}{\sqrt{42}}, \text{ and } e = 7; l = -\frac{7}{\sqrt{42}}.$$

The conventional likelihood metric calculation method including the above described operations has the following problems.

First of all, a dividing operation or a divider is utilized in the operation of compensating distortion of a received signal based on a channel estimate, as shown in Equation 2. As is already known, the dividing by an arbitrary number other than a two's power makes the likelihood metric calculation more complicated, thereby deteriorating a calculation speed and increasing an embodiment cost.

Also, the conventional likelihood metric calculation method is based on a distance metric and indicates a location of each symbol as a fixed location in a signal constellation. Also, since the fixed symbol location becomes a standard for comparison when calculating a likelihood metric, an effect caused by a channel variation is not properly reflected. Accordingly, a likelihood metric calculation performance may be deteriorated. In particular, in the case of a wireless communication system in which a channel variation is severe, a satisfactory result may not be obtained.

Accordingly, the present invention proposes a new technology which can quickly and accurately calculate a likelihood metric of a received signal in digital communication systems including wireless communication systems.

SUMMARY OF THE INVENTION

The present invention provides a likelihood metric calculation method of a higher order QAM signal, which can decrease the complexity of a calculation and increase the accuracy thereof.

The present invention also provides a likelihood metric calculation method which can use a point in a signal constellation where channel variation effect is reflected, as a comparison standard, thereby more accurately calculating likelihood metric information to be utilized when decoding a channel.

The present invention also provides a region variable, which is represented as a region which varies according to the variation of a channel as a comparison standard, instead of using a signal constellation having a fixed symbol location as a comparison standard, thereby improving a message detection performance in a wireless communication environment where a channel variation is severe.

The present invention also provides a likelihood metric calculation method which, when compensating a channel based on a channel characteristic, can remove a dividing operation or a divider having a higher degree of hardware and software complexity and can make a receiving device to be effectively constructed and operated.

The present invention also provides a likelihood metric calculation method which can output a likelihood metric result which is a closed form of a linear expression according to a result of comparison with the region variable, thereby more accurately calculating the likelihood metric while not increasing the complexity of a system.

The present invention also provides a likelihood metric calculation method which can increase a connection establishment performance of a system and also can more stably and quickly transmit/receive data, by more effectively calculating a likelihood metric. In particular, the present invention provides a likelihood metric calculation method which can improve a system operating performance in a fast fading channel or a frequency selective fading channel environment.

According to an aspect of the present invention, there is provided a method of calculating a likelihood metric of a received signal in a digital communication system, the method including: estimating a channel of the received signal; compensating a channel of the received signal based on the channel estimate; calculating a region variable based on the channel estimate, the region variable being a value obtained by scaling a symbol coordinate value in a signal constellation corresponding to the received signal utilizing the channel estimate; and comparing the region variable and a magnitude of the compensated received signal and calculating a likelihood metric of the received signal according to a result of the comparison.

According to another aspect of the present invention, there is provided an apparatus for calculating a likelihood metric of a received signal in a digital communication system, the apparatus including: a channel estimation unit estimating a channel of the received signal; a channel compensation unit compensating a channel of the received signal based on the channel estimate; a region variable calculation unit calculating a region variable based on the channel estimate, the region variable being a value obtained by scaling a symbol coordinate value in a signal constellation corresponding to the received signal utilizing the channel estimate; a comparison unit comparing the region variable and a magnitude of the compensated received signal; and a bit metric calculation unit calculating a likelihood metric with respect to each bit of the compensated received signal according to a result of the comparison.

A digital communication system as used in the present specification is a system transmitting/receiving one of a discrete number of waves for a discrete time interval in a form such as an electromagnetic signal or an optical signal. The digital communication system includes any type of wired/wireless systems which transmit either a transmission message containing digital information or analog information represented by digital data. Examples of the digital communication system include digital mobile communication systems, digital satellite communication systems, digital optical communication systems, digital broadcasting systems, and the wired/wireless Internet.

The digital communication system may apply a digital modulation to a symbol of a transmission message and transmit the modulated signal to a receiving end via a wired or a wireless channel. Also, the receiving end may include a message detection unit. The message detection unit receives a transmitted signal and restores the transmission message from the received signal.

In describing the configuration and effects of the present invention, a QAM signal will be utilized as an example when comparing with the conventional art. QAM is characterized by a plurality of symbols densely allocated in a complex domain. In this instance, the complex region is represented as a signal constellation. Also, QAM is a representative example for applying the aforementioned soft decision decoding and is being widely utilized in actual systems. For convenience of description, 16QAM and 64QAM signals, which are comparatively simple and frequently used, will be utilized as an example. However, a method and apparatus according to the present invention will be applicable to 256QAM, 512QAM and other higher QAM signals. Also, the present invention is not limited to a system using a QAM method, and may be applied to general digital communication systems. Namely, the present invention may be widely applicable to a received signal of any modulation schemes which can represent each symbol included in a modulated signal as a signal constellation, that is, a location in a complex domain.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
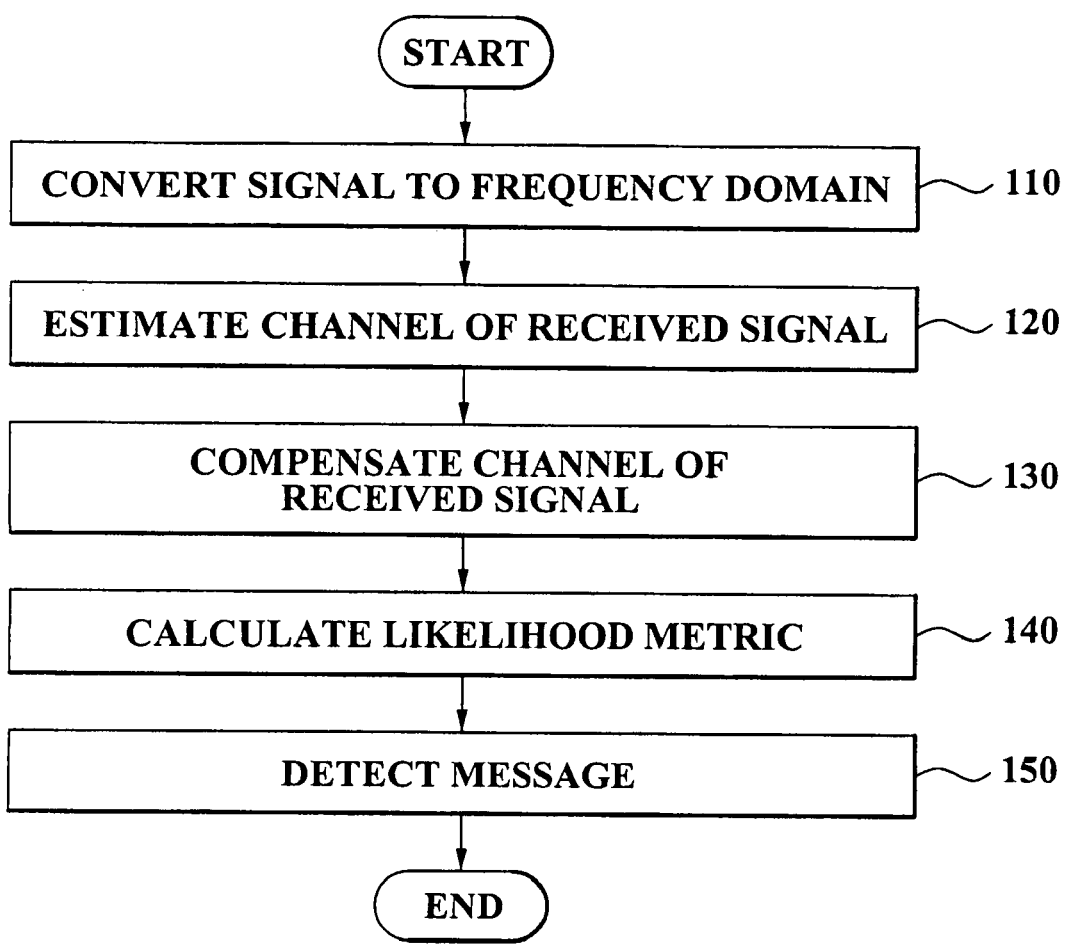
FIG. 1 is a flowchart illustrating a method of receiving a signal transmitted from a conventional digital communication system.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 4:
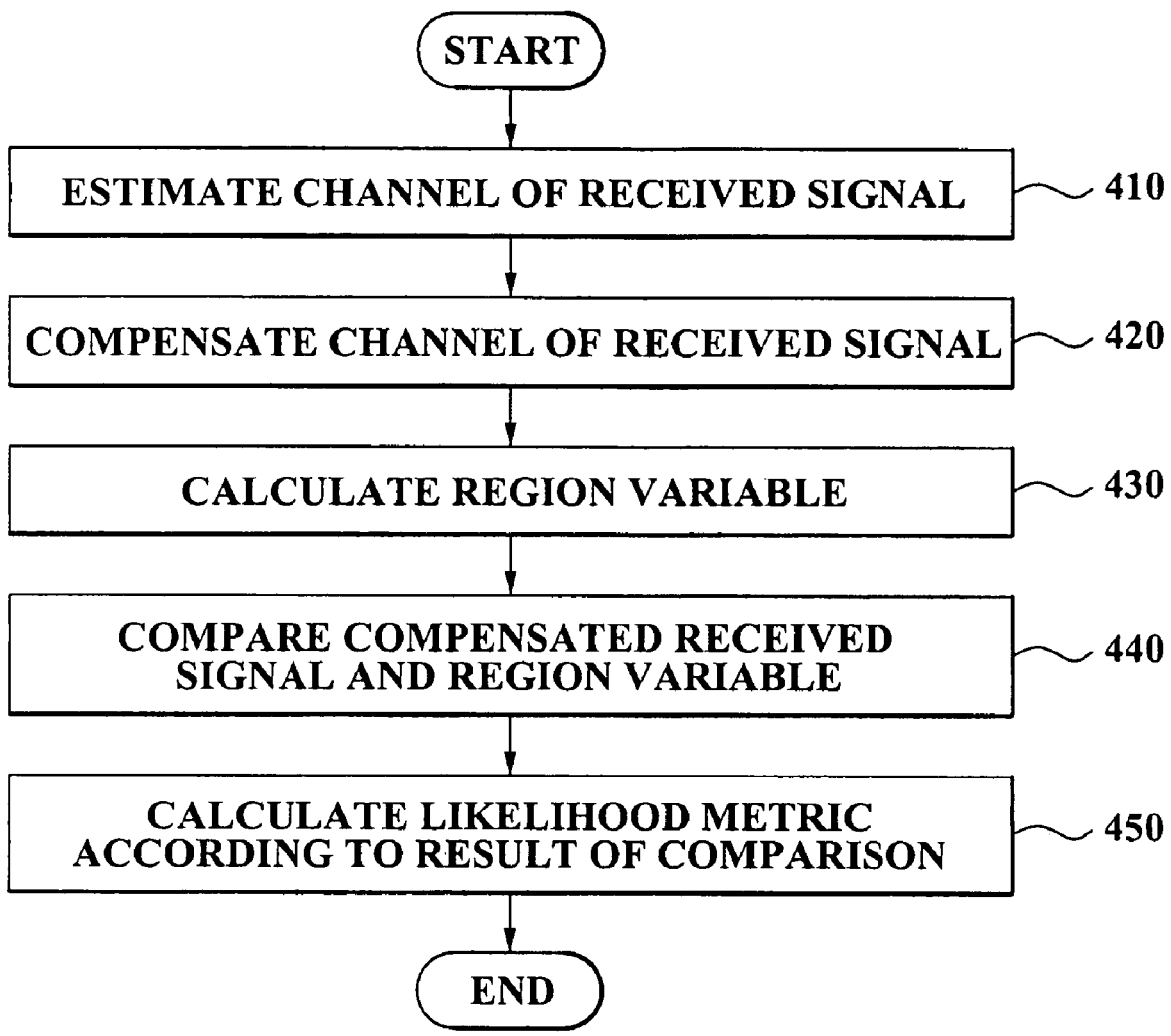
FIG. 4 is a flowchart illustrating a method of calculating a likelihood metric of a received signal according to an embodiment of the present invention.

FIG. 4 is a flowchart illustrating a likelihood metric calculation method according to an embodiment of the present invention. As illustrated in FIG. 4, the likelihood metric calculation method according to an embodiment of the present invention estimates a channel of a received signal in operation 410, compensates the channel based on the channel estimate in operation 420, calculates a region variable based on the channel estimate in operation 430, compares the region variable with the compensated received signal in operation 440, and calculates a likelihood metric according to a result of the comparison in operation 450.

A transmitted signal of a digital communication system is transmitted to a receiving end via a wired/wireless channel. Distortion of the signal occurs according to the status of the channel. When the distortion of the signal is not properly compensated, the receiving end may not perfectly restore a transmission message, and may have a deteriorated system performance.

Accordingly, operation 410 of estimating a channel characteristic is needed to compensate distortion of a signal caused by a channel, that is, to compensate a channel of a received signal. The estimating of the channel may utilize, for example, a training symbol which is pre-defined between transmitting and receiving ends.

In operation 420, the signal receiving end of the digital communication system compensates the channel of the received signal based on the channel estimate generated in operation 410. The likelihood metric calculation method according to the present invention includes compensating a channel by multiplying the received signal and a complex conjugate of the channel estimate, shown as, $$r_k = h_k^* y_k = |h_k|^2 C_k + h_k^* n_k \quad \text{[Equation 8]}$$

In this instance, $y_k$ is the received signal, $C_k$ is a transmitted signal of a $k^{th}$ symbol, $h_k$ is the channel estimate, and $n_k$ is a noise component of the receiving end. A phase of the received signal, $y_k$, is moved through the aforementioned process.

As shown in Equation 8, the compensating of the channel included in the likelihood metric calculation method according to the present invention does not utilize a division by $|h_k|^2$. As described above, the likelihood metric calculation method does not utilize a dividing operation or a divider which has been shown as a factor in deteriorated system performance in the conventional method. Accordingly, a complexity of hardware and software is decreased which improves a system performance. Namely, the present invention has a technical characteristic of separating the two calculations constituting the channel compensating operation in the conventional art, i.e., a multiplication by $h_k^*$ and a division by $|h_k|^2$. Accordingly, a system performance may be improved.

However, since the compensated signal in the above-described operation does not reflect $|h_k|^2$, a signal constellation having a fixed symbol location as in the conventional art cannot be applied. Accordingly, the likelihood metric calculation method according to the present invention includes a new operation of calculating a new variable referred to as a region variable, comparing the region variable and the magnitude of the compensated received signal, and calculating a likelihood metric.

The region variable may be obtained by scaling a symbol coordinate value in a signal constellation utilizing a channel estimate. More particularly, the region variable may be calculated by multiplying a symbol coordinate value in a signal constellation corresponding to a received signal by $|h_k|^2$, a square of an absolute value of a channel estimate. Namely, a dividing operation of a received signal included in the conventional art is replaced with a multiplying operation with respect to the symbol coordinate value corresponding to the received signal. As described above, a value obtained by scaling a symbol coordinate value in a signal constellation using the magnitude of a channel estimate, i.e., a channel magnitude scaled version of the constellation point, is utilized as a region variable. Accordingly, a complexity is decreased and the likelihood metric calculation method can be easily embodied.

Hereinafter, the likelihood metric calculation method using a calculation of the region variable, the magnitude comparison of the region variable, and the compensated received signal will be described in detail by taking an example of a 16QAM signal.

When a $1^{st}$ bit included in a QAM signal with respect to a $k^{th}$ symbol is $b_1$, likelihood $L_k$ of the $1^{st}$ bit is represented as, $$L_k(b_1 \mid 1) = \left\{ \frac{1}{\sqrt{\pi \sigma_n^2 |h_k|^2}} \exp\left(-\frac{\left(r_{y,k} + \frac{|h_k|^2}{\sqrt{10}}\right)^2}{\sigma_n^2 |h_k|^2}\right) + \frac{1}{\sqrt{\pi \sigma_n^2 |h_k|^2}} \exp\left(-\frac{\left(r_{y,k} + \frac{3|h_k|^2}{\sqrt{10}}\right)^2}{\sigma_n^2 |h_k|^2}\right) \right\}, \quad \text{[Equation 9]}$$

-continued $$L_k(b_1 \mid 0) = \left\{ \frac{1}{\sqrt{\pi\sigma_n^2|h_k|^2}} \exp\left(-\frac{\left(r_{y,k} - \frac{|h_k|^2}{\sqrt{10}}\right)^2}{\sigma_n^2|h_k|^2}\right) + \right.$$

$$\left. \frac{1}{\sqrt{\pi\sigma_n^2|h_k|^2}} \exp\left(-\frac{\left(r_{y,k} - \frac{3|h_k|^2}{\sqrt{10}}\right)^2}{\sigma_n^2|h_k|^2}\right) \right\}.$$

In this instance, $\sigma_n^2$ indicates a noise variance, and $L_k(b_1|0)$ indicates a likelihood when a transmitting end transmits '0' with respect to the $1^{st}$ bit of the $k^{th}$ symbol. Also, in Equation 9, $r_{x,k}$ and $r_{y,k}$ are defined as $r_{x,k}=\text{Re}\{h_k^* y_k\}$ and $r_{y,k}=\text{Im}\{h_k^* y_k\}$. Also, $r_{x,k}$ and $r_{y,k}$ are real-valued signals and an AWGN variance thereof is $$\frac{|h_k|^2 \sigma_n^2}{2}.$$

An LLR with respect to the received signal may be obtained by using a likelihood value as calculated in Equation 9. The LLR indicates the ratio of a likelihood value with respect to a transmitted signal having a value of either '0' or '1', for each bit, and is defined by Equation 4. The LLR value is an indicator of a likelihood metric. Also, the value may decrease a calculation burden caused by an exponential calculation and also limit a numerical value within a certain range. Accordingly, the value is very useful. The decreasing of the calculation burden may function as an advantage in embodying system software and hardware. Accordingly, as an example of a likelihood metric, a method of calculating the LLR will be described herein. However, the present invention is not limited thereto, and may be applied to calculation with respect to any metric which is utilized in a test for detecting a message.

The LLR of the $1^{st}$ bit of the received signal obtained by the likelihood metric calculation method according to the present invention is represented as, $$LLR_k(b_1) \cong \max\left(-\frac{\left(r_{y,k} - \frac{|h_k|^2}{\sqrt{10}}\right)^2}{\sigma_n^2|h_k|^2}, -\frac{\left(r_{y,k} - \frac{3|h_k|^2}{\sqrt{10}}\right)^2}{\sigma_n^2|h_k|^2}\right) -$$

$$\max\left(-\frac{\left(r_{y,k} + \frac{|h_k|^2}{\sqrt{10}}\right)^2}{\sigma_n^2|h_k|^2}, -\frac{\left(r_{y,k} + \frac{3|h_k|^2}{\sqrt{10}}\right)^2}{\sigma_n^2|h_k|^2}\right)$$

[Equation 10]

As shown in Equation 10, the likelihood metric calculation method according to an embodiment of the present invention obtains the LLR using a value which is obtained by scaling a symbol coordinate value in a signal constellation corresponding to the received signal with $|h_k|^2$. This is because $|h_k|^2$ is not reflected in the compensating of the channel, which is included in the likelihood metric calculation method according to an embodiment of the present invention. Namely, the likelihood metric calculation method according to the present invention separates $h_k^*$ and $|h_k|^2$, and includes $h_k^*$ in the compensating of the channel and includes $|h_k|^2$ in the calculating of the likelihood metric for each bit. Accordingly, a dividing operation or a divider may be removed.

Also, comparing Equation 10 with Equation 5, unlike the conventional method, the LLR of the present invention is scaled by $|h_k|^2$, a square of an absolute magnitude of a channel estimate. Namely, in an identical channel environment, the likelihood metric calculated according to the present invention has a value $|h_k|^2$ times larger than that of the conventional art. A larger LLR may be outputted for a larger channel gain, which means a good channel environment. Also, a likelihood which is nearer to 0 may be outputted for a bad channel environment. Namely, when assigning a weight on a basis of a channel gain, calculation accuracy will be better than in the conventional method.

When the LLR, represented as Equation 10, is applied to all bits of a 16QAM signal, an LLR value of each bit is calculated as, $$LLR_k(b_0) = 2h_{sq} - r_{y,k},$$ [Equation 11]

$$LLR_k(b_1) = 2(r_{y,k} + h_{sq}), \quad (r_{y,k} \leq -2h_{sq})$$
$$\phantom{LLR_k(b_1) =} 2(r_{y,k} - h_{sq}), \quad (r_{y,k} > 2h_{sq})$$
$$\phantom{LLR_k(b_1) =} r_{y,k}, \quad \text{otherwise.}$$

$$LLR_k(b_2) = 2h_{sq} - r_{x,k}.$$

$$LLR_k(b_3) = 2(r_{x,k} + h_{sq}), \quad (r_{x,k} \leq -2h_{sq})$$
$$\phantom{LLR_k(b_3) =} 2(r_{x,k} - h_{sq}), \quad (r_{x,k} > 2h_{sq})$$
$$\phantom{LLR_k(b_3) =} r_{x,k}, \quad \text{otherwise.}$$

where, $$r_{x,k} = \text{Re}\{h_k^* y_k\}, \; r_{y,k} = \text{Im}\{h_k^* y_k\}$$

$$h_{sq} = \frac{|h_k|^2}{\sqrt{10}}$$

Figure 2:
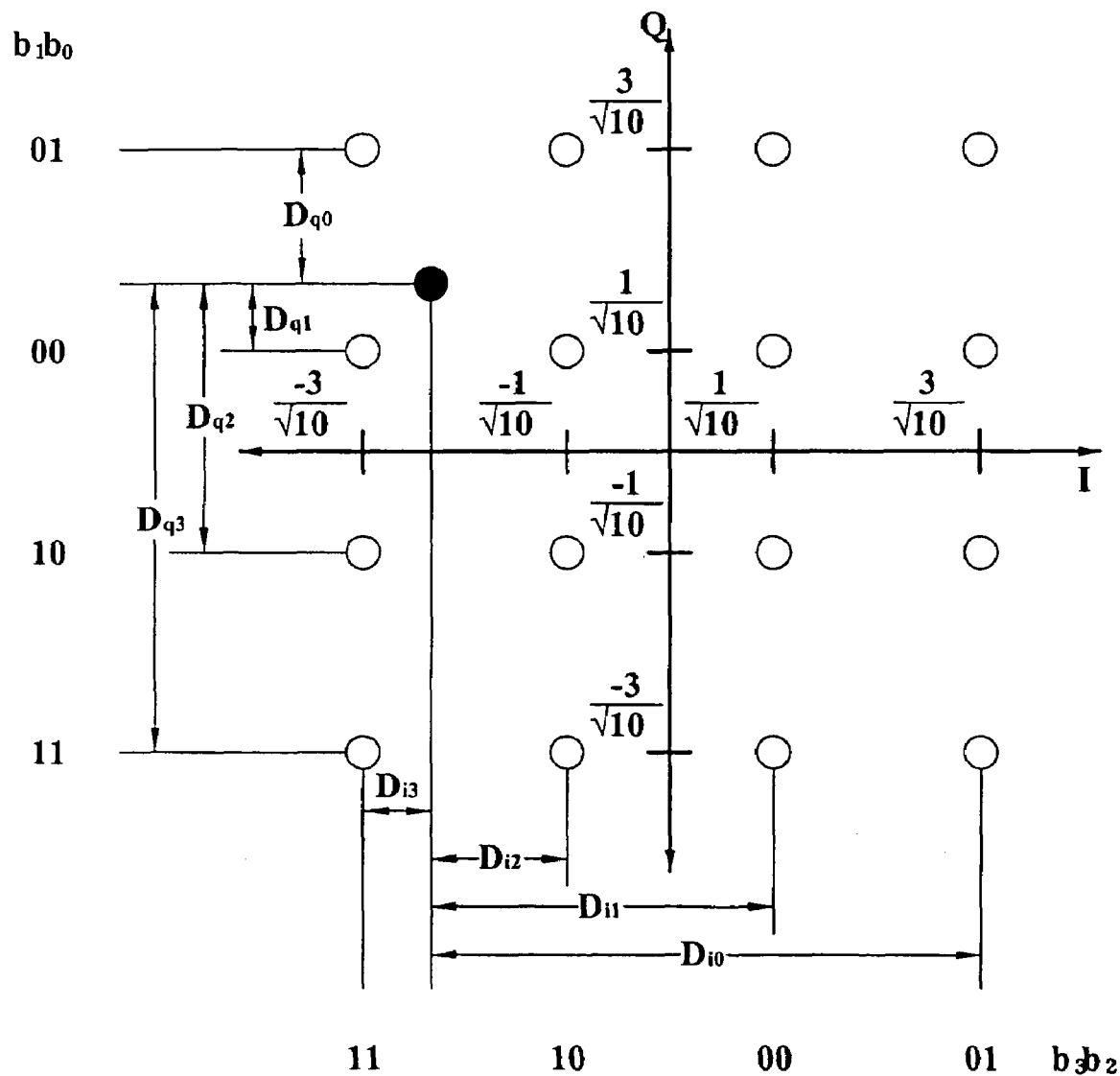
FIG. 2 is a diagram illustrating a method of calculating a likelihood metric of a 16QAM signal using a signal constellation according to the conventional art.

In Equation 11, the received signal is a signal with respect to a symbol represented as a grey code, and $0^{th}$ and $1^{st}$ bits of the received signal constitute an imaginary axis coordinate and $2^{nd}$ and $3^{rd}$ bits of the received signal constitute a real axis coordinate, in the signal constellation. Also, Equation 11 takes a symbol location in the signal constellation as shown in FIG. 2, as a standard, for comparison with the conventional art. Currently, most communication systems are utilizing a grey code in order to reduce an effect caused by an error. Also, the symbol location of FIG. 2 follows the Institute of Electrical and Electronics Engineers (IEEE) 802.16d/e OFDMA (orthogonal frequency division multiple access) standard. However, the embodiment represented as Equation 11 is only an embodiment of the present invention. The present invention is not limited thereto.

Referring to Equation 11, when calculating an LLR with respect to the $1^{st}$ bit and the $3^{rd}$ bit, the magnitude of a real and an imaginary part of the compensated received signal, $r_{x,k}$ and $r_{y,k}$ respectively, is compared with the region variable $\pm 2h_{sq}$ which is obtained by scaling a symbol coordinate value in a signal constellation with $|h_k|^2$. In other words, it is determined first whether the magnitude of a real or an imaginary part of the compensated received signal is larger or smaller than the region variable before a bit-by-bit LLR value calculation. In this way, the region variable and the compensated received signal is compared, and a comparison region is determined for a likelihood metric calculation. Note that the comparing of the region variable and the compensated received signal is done at the level of an entire signal bits, not at the level of an individual bit. For example, the comparing is not required for calculating an LLR value of the $0^{th}$ and the $2^{nd}$ bits.

An LLR value is calculated by a different method according to a result of the comparison. As an example, Equation 11 calculates a likelihood metric of the $1^{st}$ bit as, if $r_{y,k} \leq -2h_{sq}$, $LLR_k(b_1)=2(r_{y,k}+h_{sq})$, elseif $r_{y,k}>2h_{sq}$, $LLR_k(b_1)=2(r_{y,k}-h_{sq})$, and else $LLR_k(b_1)=r_{y,k}$.

In this instance, $\pm 2h_{sq}$, which is compared with the compensated received signal, is a region variable. Once the comparison range of the compensated received signal is determined by the region variable, an LLR is calculated by the method as Equation 11, with respect to symbols which are highly probable to be received in the form of the compensated received signal among each symbol location of 16QAM.

As described above, the likelihood metric calculation method according to the present invention adopts a region variable which is different from the conventional method utilizing the signal constellation having fixed symbol locations. Accordingly, the likelihood metric calculation method according to the present invention determines a comparison region of the compensated received signal and reflects a channel estimate in the comparison region and calculates a likelihood metric. Thus, the likelihood metric calculation method according to the present invention may prevent deterioration of a message detection performance caused by a channel variation. In particular, in the case of a mobile communication or a wireless communication system, for example, in the case of an OFDM or an OFDMA system, a channel variation clearly appears according to a wireless channel state and physical movement of a receiving end. In this instance, the likelihood metric calculation method according to the present invention utilizes a comparison region which adaptively varies based on a channel estimate. Accordingly, it is possible to effectively prevent a performance from deterioration caused by the channel variation.

Also, the conventional method based on a distance in a signal constellation having a fixed symbol location approximates a noise in the form of Gaussian distribution to a linear model. Accordingly, the conventional method does not properly reflect the effect by the noise. On the other hand, the likelihood metric calculation method according to the present invention utilizes a new comparison standard using a region variable, not the distance in the signal constellation having the aforementioned limit. Accordingly, the likelihood metric calculation method according to the present invention may more accurately reflect the effect by the channel noise and improve a message detection performance in the entire system.

Figure 5:
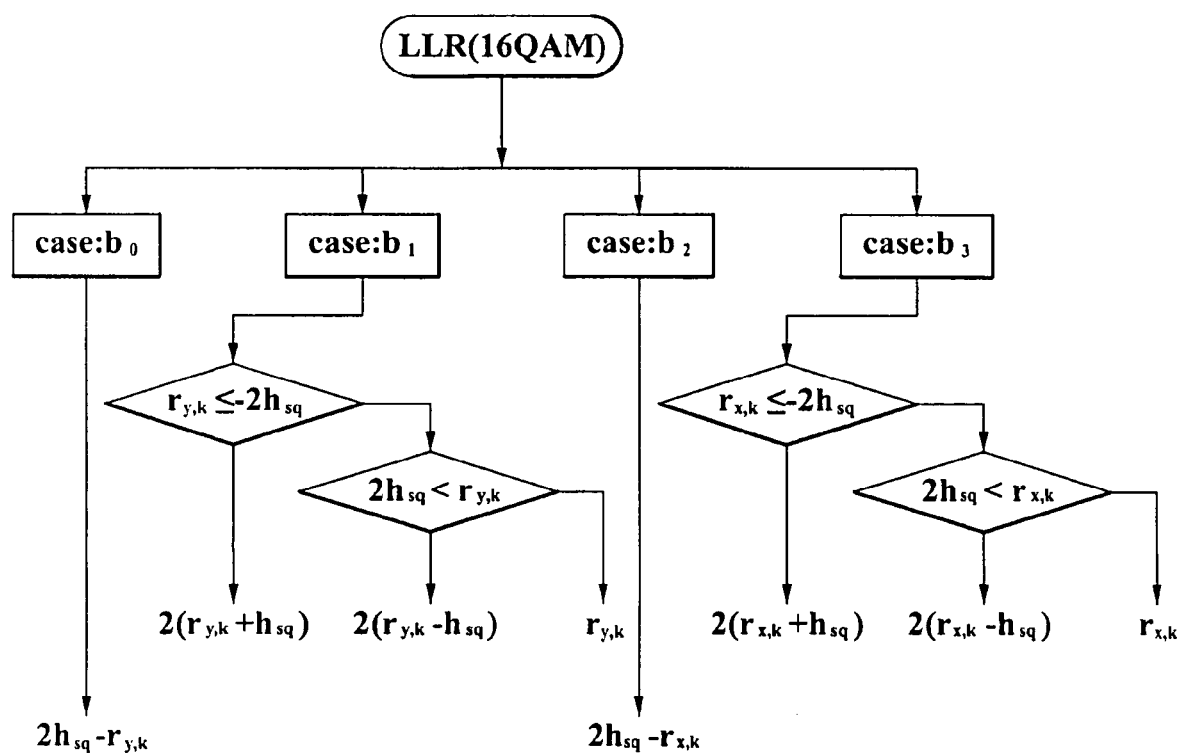
FIG. 5 is a flowchart illustrating a method of calculating a likelihood metric of a 16QAM signal according to an embodiment of the present invention.

FIG. 5 is a flowchart illustrating, in further detail, operation 450 of FIG. 4 for each bit, in a likelihood metric calculation method of a 16QAM signal according to an embodiment of the present invention.

As illustrated in FIG. 5, with respect to the $0^{th}$ bit and the $2^{nd}$ bit, LLR values are calculated as $LLR_k(b_0)=2h_{sq}-r_{y,k}$ and $LLR_k(b_2)=2h_{sq}-r_{x,k}$, without c region variable. With respect to the $1^{st}$ bit and the $3^{rd}$ bit, comparison regions are determined through a comparison of a signal magnitude with $\pm 2h_{sq}$. Also, a likelihood metric, which is represented as an LLR, is calculated with respect to each comparison region. More particularly, with respect to the $1^{st}$ bit, $LLR_k(b_1)$ is calculated as, if $r_{y,k} \leq -2h_{sq}$, $2(r_{y,k}+h_{sq})$; elseif $r_{y,k}>2h_{sq}$, $2(r_{y,k}-h_{sq})$; and else $r_{y,k}$. Also, with respect to the $3^{rd}$ bit, $LLR_k(b_3)$ is calculated as, if $r_{x,k} \leq -2h_{sq}$, $2(r_{x,k}+h_{sq})$; elseif $r_{x,k}>2h_{sq}$, $2(r_{x,k}-h_{sq})$; and else $r_{x,k}$.

The likelihood metric calculation method applied to 16QAM is also applied to 64QAM and other higher order QAM. Namely, the characteristic of the present invention which separates $h_k^*$ and $|h_k|^2$, and includes $h_k^*$ in the compensating of the channel and $|h_k|^2$ in the calculating of the likelihood metric may be applied to 64QAM. In other words, the likelihood metric calculation method applied to 64QAM also may include comparing the compensated received signal and a region variable which is obtained by scaling the symbol coordinate value in the signal constellation with $|h_k|^2$.

Figure 6:
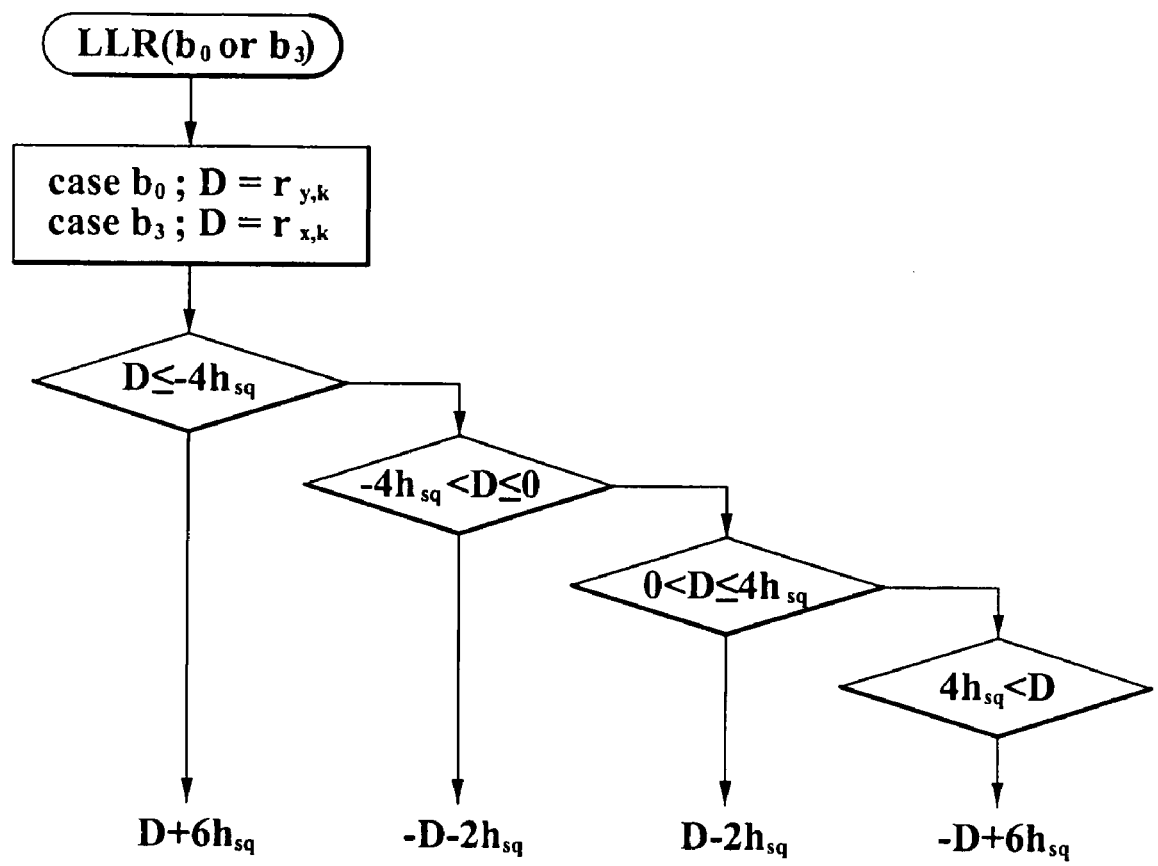
FIG. 6 is a flowchart illustrating a method of calculating likelihood metrics of a $0^{th}$ bit and a $3^{rd}$ bit in a likelihood metric calculation method of a 64QAM signal according to an embodiment of the present invention.
Figure 7:
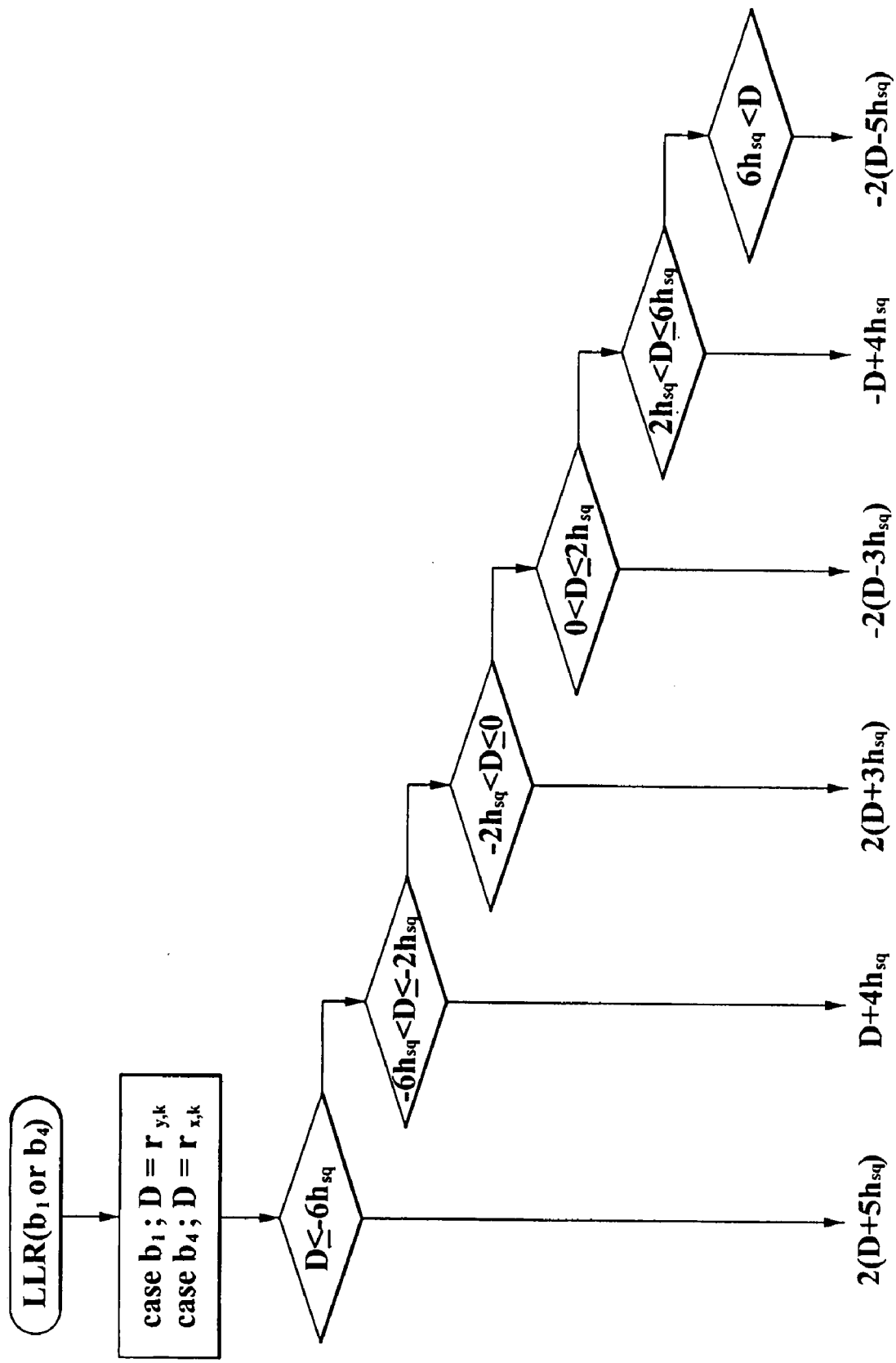
FIG. 7 is a flowchart illustrating a method of calculating likelihood metrics of a $1^{st}$ bit and a $4^{th}$ bit in a likelihood metric calculation method of a 64QAM signal according to an embodiment of the present invention.
Figure 8:
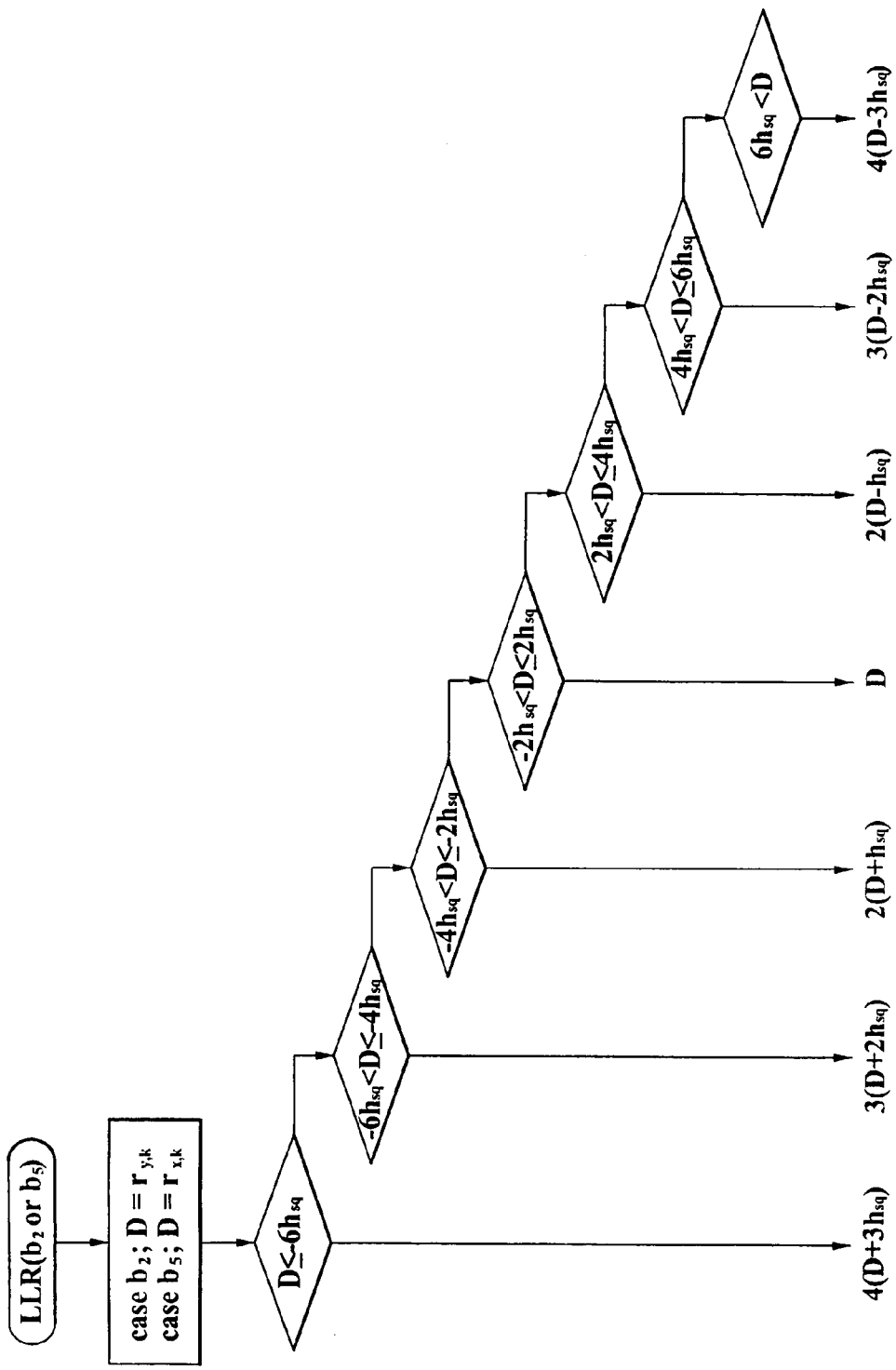
FIG. 8 is a flowchart illustrating a method of calculating likelihood metrics of a $2^{nd}$ bit and a $5^{th}$ bit in a likelihood metric calculation method of a 64QAM signal according to an embodiment of the present invention.

FIGS. 6 to 8 are flowcharts illustrating further in detail the operation 450 of FIG. 4 for each bit, in a likelihood metric calculation method of 64QAM according to an embodiment of the present invention.

FIG. 6 is a flowchart illustrating a likelihood metric calculation method with respect to a $0^{th}$ bit and a $3^{rd}$ bit, FIG. 7 is a flowchart illustrating a likelihood metric calculation method with respect to a $1^{st}$ bit and a $4^{th}$ bit, and FIG. 8 is a flowchart illustrating a likelihood metric calculation method with respect to a $2^{nd}$ bit and a $5^{th}$ bit.

64QAM represents each symbol with 6 bits, which is different from 16QAM. Accordingly, more operations are needed for comparison than with 16QAM. As described above with respect to 16QAM, even with respect to 64QAM, a method of calculating a likelihood metric, for example, in the form of the LLR, may be represented as $$LLR_k(b_0) = \begin{cases} r_{y,k} + 6h_{sq}, & (r_{y,k} \leq -4h_{sq}) \\ -r_{y,k} - 2h_{sq}, & (-4h_{sq} < r_{y,k} \leq 0) \\ r_{y,k} - 2h_{sq}, & (0 < r_{y,k} \leq 4h_{sq}) \\ -r_{y,k} + 6h_{sq}, & \text{otherwise.} \end{cases}$$ [Equation 12]

$$LLR_k(b_1) = \begin{cases} 2(r_{y,k} + 5h_{sq}), & (r_{y,k} \leq -6h_{sq}) \\ r_{y,k} + 4h_{sq}, & (-6h_{sq} < r_{y,k} \leq -2h_{sq}) \\ 2(r_{y,k} + 3h_{sq}), & (-2h_{sq} < r_{yk} \leq 0) \\ -2(r_{y,k} - 3h_{sq}), & (0 < r_{y,k} \leq 2h_{sq}) \\ -r_{y,k} + 4h_{sq}, & (2h_{sq} < r_{y,k} \leq 6h_{sq}) \\ -2(r_{y,k} - 5h_{sq}), & \text{otherwise.} \end{cases}$$

$$LLR_k(b_2) = \begin{cases} 4(r_{y,k} + 3h_{sq}), & (r_{y,k} \leq -6h_{sq}) \\ 3(r_{y,k} + 4h_{sq}), & (-6h_{sq} < r_{y,k} \leq -4h_{sq}) \\ 2(r_{y,k} + 2h_{sq}), & (-4h_{sq} < r_{y,k} \leq -2h_{sq}) \\ r_{y,k}, & (-2h_{sq} < r_{y,k} \leq 2h_{sq}) \\ 2(r_{y,k} - h_{sq}), & (2h_{sq} < r_{y,k} \leq 4h_{sq}) \\ 3(r_{y,k} - 2h_{sq}), & (4h_{sq} < r_{y,k} \leq 6h_{sq}) \\ 4(r_{y,k} - 3h_{sq}), & \text{otherwise.} \end{cases}$$

$$LLR_k(b_3) = \begin{cases} r_{x,k} + 6h_{sq}, & (r_{x,k} \leq -4h_{sq}) \\ -r_{x,k} - 2h_{sq}, & (-4h_{sq} < r_{x,k} \leq 0) \\ r_{x,k} - 2h_{sq}, & (0 < r_{x,k} \leq 4h_{sq}) \\ -r_{x,k} + 6h_{sq}, & \text{otherwise.} \end{cases}$$

$$LLR_k(b_4) = \begin{cases} 2(r_{x,k} + 5h_{sq}), & (r_{x,k} \leq -6h_{sq}) \\ r_{x,k} + 4h_{sq}, & (-6h_{sq} < r_{x,k} \leq -2h_{sq}) \\ 2(r_{x,k} + 3h_{sq}), & (-2h_{sq} < r_{x,k} \leq 0) \\ -2(r_{x,k} - 3h_{sq}), & (0 < r_{x,k} \leq 2h_{sq}) \\ -r_{x,k} + 4h_{sq}, & (2h_{sq} < r_{x,k} \leq 6h_{sq}) \\ -2(r_{x,k} - 5h_{sq}), & \text{otherwise.} \end{cases}$$

Figure 3:
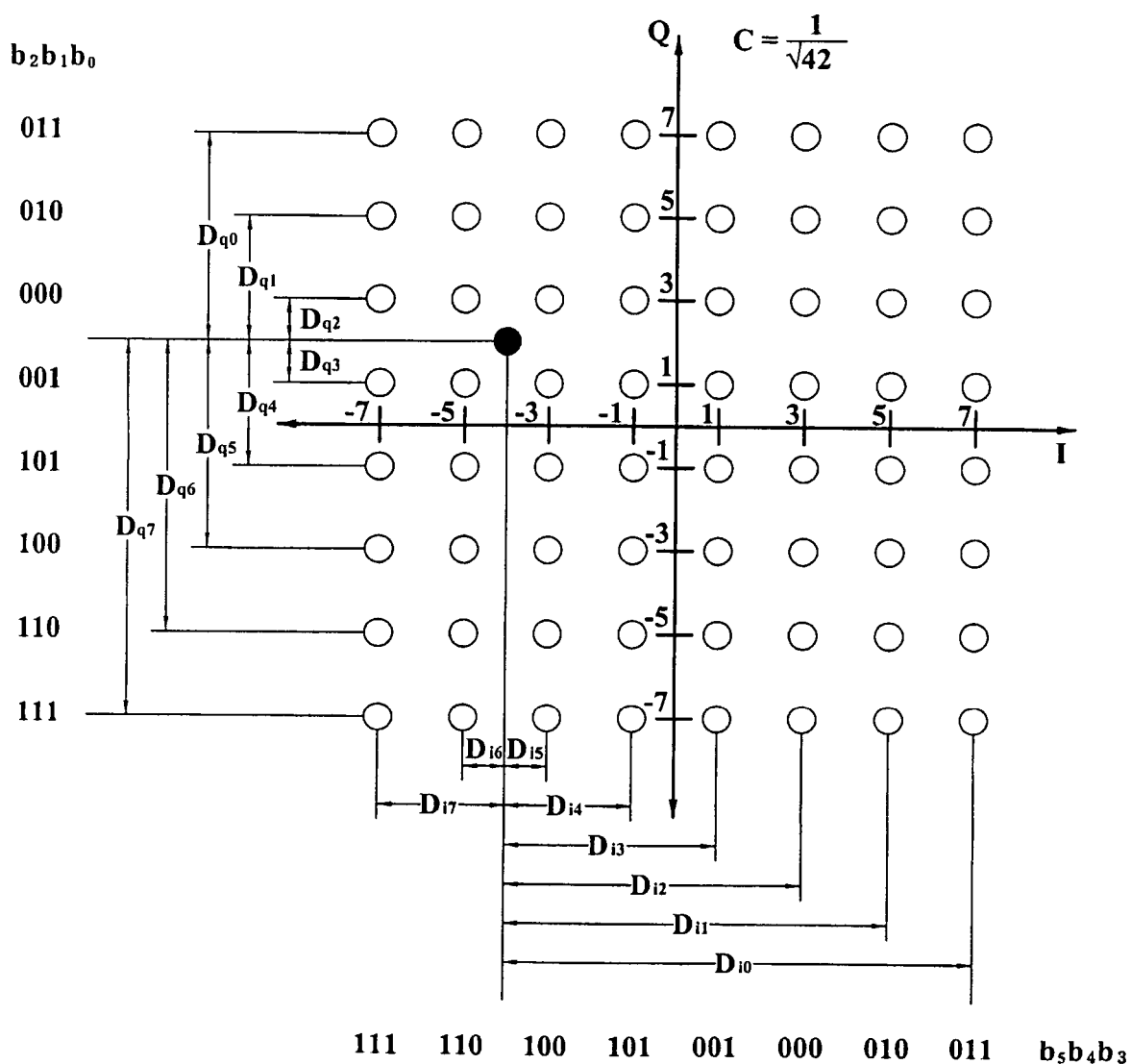
FIG. 3 is a diagram illustrating a method of calculating a likelihood metric of a 64QAM signal using a signal constellation according to the conventional art.

-continued $$LLR_k(b_5) = \begin{cases} 4(r_{x,k} + 3h_{sq}), & (r_{x,k} \leq -6h_{sq}) \\ 3(r_{x,k} + 2h_{sq}), & (-6h_{sq} < r_{x,k} \leq -4h_{sq}) \\ 2(r_{x,k} + 2h_{sq}), & (-4h_{sq} < r_{x,k} \leq -2h_{sq}) \\ r_{x,k}, & (-2h_{sq} < r_{x,k} \leq 2h_{sq}) \\ 2(r_{x,k} - h_{sq}), & (2h_{sq} < r_{x,k} \leq 4h_{sq}) \\ 3(r_{x,k} - 2h_{sq}), & (4h_{sq} < r_{x,k} \leq 6h_{sq}) \\ 4(r_{x,k} - 3h_{sq}), & \text{otherwise.} \end{cases}$$

where, $r_{x,k} = \text{Re}\{h_k^* y_k\}$, $r_{y,k} = \text{Im}\{h_k^* y_k\}$ $h_{sq} = \dfrac{|h_k|^2}{\sqrt{10}}$ Similar to Equation 11 with respect to 16QAM, in Equation 12, the received signal is a signal with respect to a symbol represented as a grey code, and $0^{th}$, $1^{st}$ and $2^{nd}$ bits of the received signal constitute an imaginary axis coordinate and $3^{rd}$, $4^{th}$ and $5^{th}$ bits of the compensated received signal constitute a real axis coordinate of the signal constellation. Also, for comparison with the conventional art, Equation 12 is based on a symbol location in the signal constellation as shown in FIG. 3.

Figure 9:
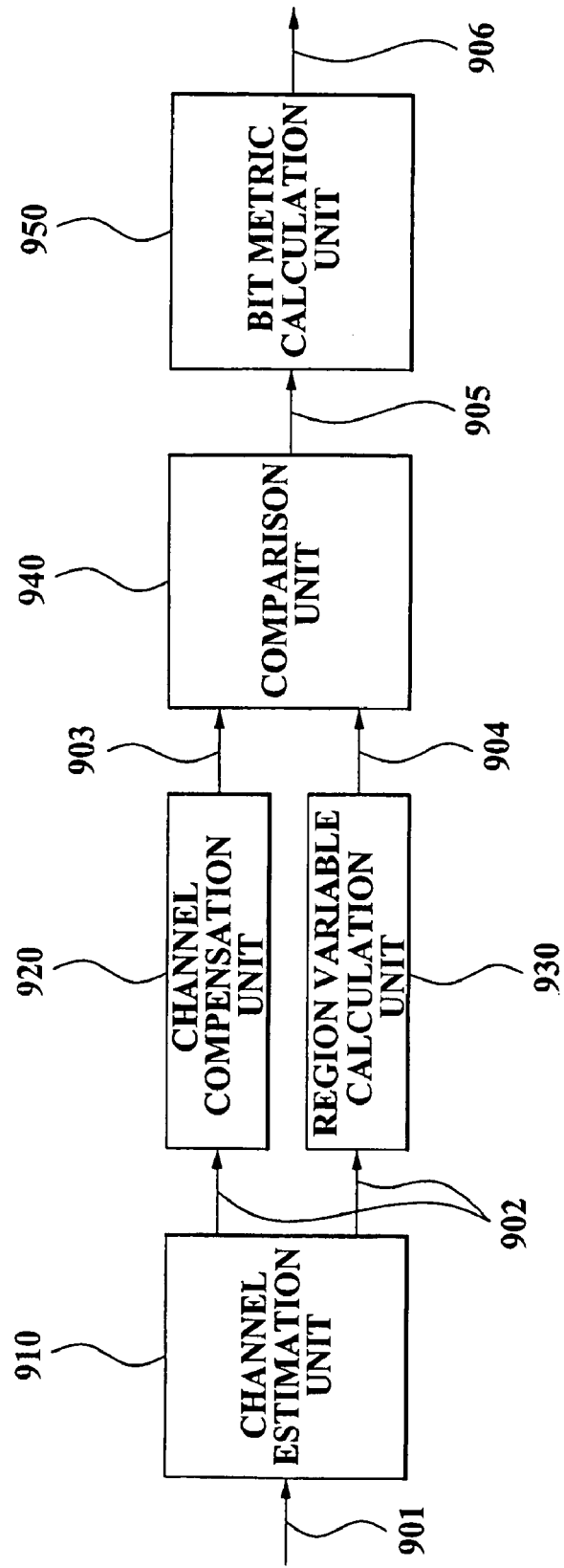
FIG. 9 is a block diagram illustrating an internal configuration of an apparatus calculating a likelihood metric of a QAM signal according to an embodiment of the present invention.

FIG. 9 is a block diagram illustrating an internal configuration of an apparatus calculating a likelihood metric of a received signal in a digital communication system according to an embodiment of the present invention.

Referring to FIG. 9, a received signal 901 is inputted into the channel estimation unit 910 and utilized for estimating its channel characteristic. Channel estimates 902 are generated by the channel estimation unit 910, and inputted into a channel compensation unit 920 and a region variable calculation unit 930. The channel compensation unit 920 compensates distortion of the received signal according to the channel estimate and generates a compensated received signal 903. Also, the region variable calculation unit 930 calculates a region variable 904 according to the channel estimate 902. In this instance, the region variable 904 is a value obtained by scaling a symbol coordinate value in a signal constellation with the channel estimate 902. A comparison unit 940 compares the magnitude of the compensated received signal 903 and the calculated region variable 904, and determines each comparison region. A likelihood metric calculation method for each bit is determined according to a result of the comparison 905. A likelihood metric calculation apparatus according to the present invention calculates a likelihood metric of each bit of a symbol according to the determined method.

According to another embodiment of the present invention, the channel compensation unit 920 may include a conjugator and a multiplier. The conjugator calculates a complex conjugate of the channel estimate. The multiplier multiplies the received signal and the complex conjugate of the channel estimate. A likelihood metric calculation apparatus according to the present embodiment constructed as above may reflect only the complex conjugate of the channel estimate, that is, $h_k^*$ in channel compensation. This is different from the conventional apparatus.

Also, the likelihood metric calculation apparatus according to the present embodiment does not include a division operation or a divider which was needed for channel compensation in the conventional apparatus. Accordingly, a complexity is decreased and the likelihood metric calculation apparatus can be easily embodied. Also, $h_k^*$, which is utilized in a dividing operation in the conventional apparatus and is a square of an absolute value of a channel estimate, is multiplied with a symbol coordinate value in a signal constellation by the multiplier included in the region variable calculation unit 930. Through this, $h_k^*$ may be reflected when calculating a likelihood metric.

The likelihood metric calculation method according to the present invention has been described above. Description referred to in embodiments according to FIGS. 4 to 8 may be applied to the present embodiment as is. Accordingly, detailed description related thereto will be omitted hereinafter.

According to another embodiment of the present invention, in a system encoding a digital signal and transmitting the encoded digital signal, a likelihood metric for each bit is calculated in a receiving end, and outputted to a decoder and utilized for detecting a transmitted message. The decoder may be constructed as a maximum likelihood decoder which detects an encoded data symbol in a transmitting end by using a calculated likelihood metric, such as a Viterbi decoder or a trellis decoder.

The present invention may be applicable to any decoders corresponding to a turbo code or a Reed-Solomon code, and other codes which show suitable characteristics in a wireless channel and a high speed data channel. Also, a likelihood metric calculated according to an embodiment of the present invention may be inputted into a maximum likelihood decoder which takes the calculated likelihood metric as a direct determination criterion.

FIGS. 10 to 13 are graphs illustrating simulation results of the likelihood metric calculation method according to an embodiment of the present invention. In FIGS. 10 to 13, the performance between the conventional likelihood metric calculation method and the likelihood metric calculation method of an embodiment of the present invention is compared.

With respect to a 16QAM signal (uplink PUSC mode) and a 64QAM signal (downlink PUSC mode), simulations are performed in a pedestrian-A channel (PedA) and a pedestrian-B channel (PedB) model environments. A received signal is a signal which is encoded via a convolutional encoder having a code rate of one half. A result of likelihood metric calculation is inputted into the Viterbi decoder.

Figure 10:
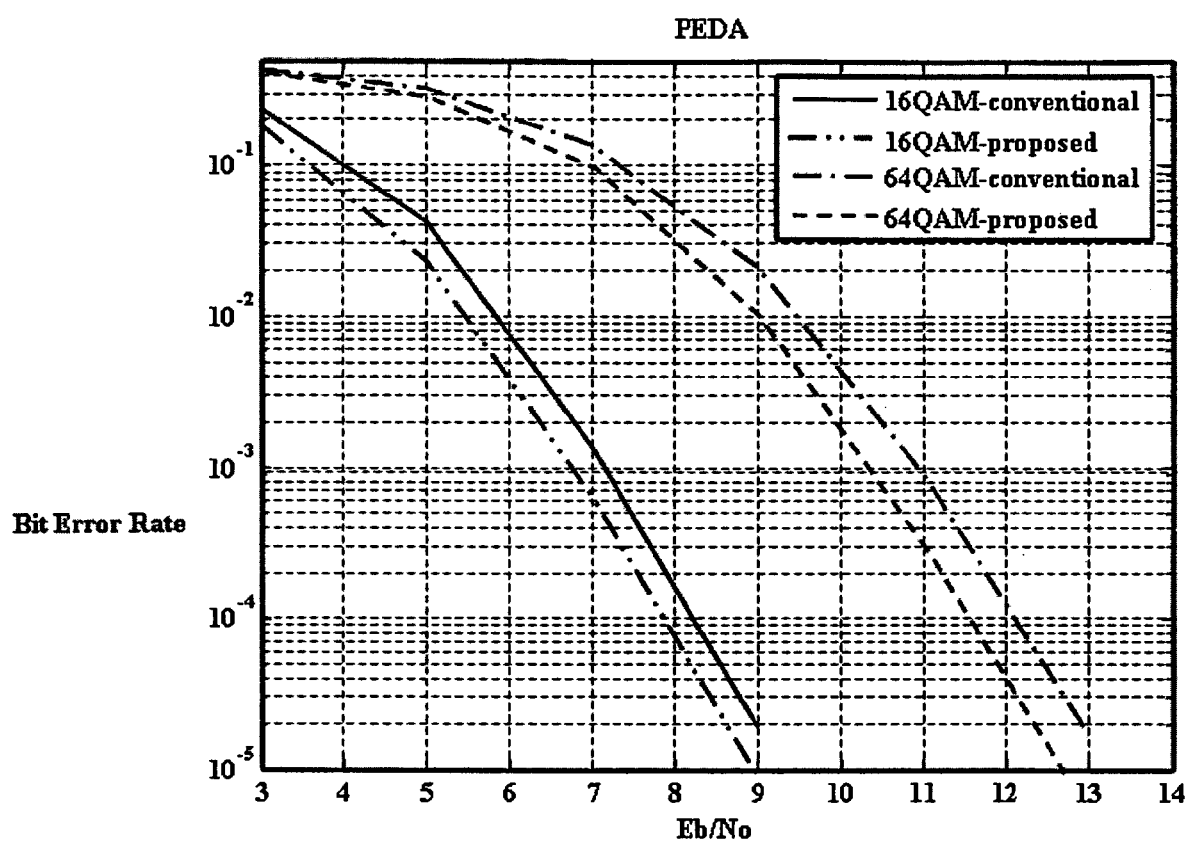
FIG. 10 is a graph illustrating a simulation result of a pedestrian-A system utilizing a likelihood metric calculation method according to an embodiment of the present invention.
Figure 11:
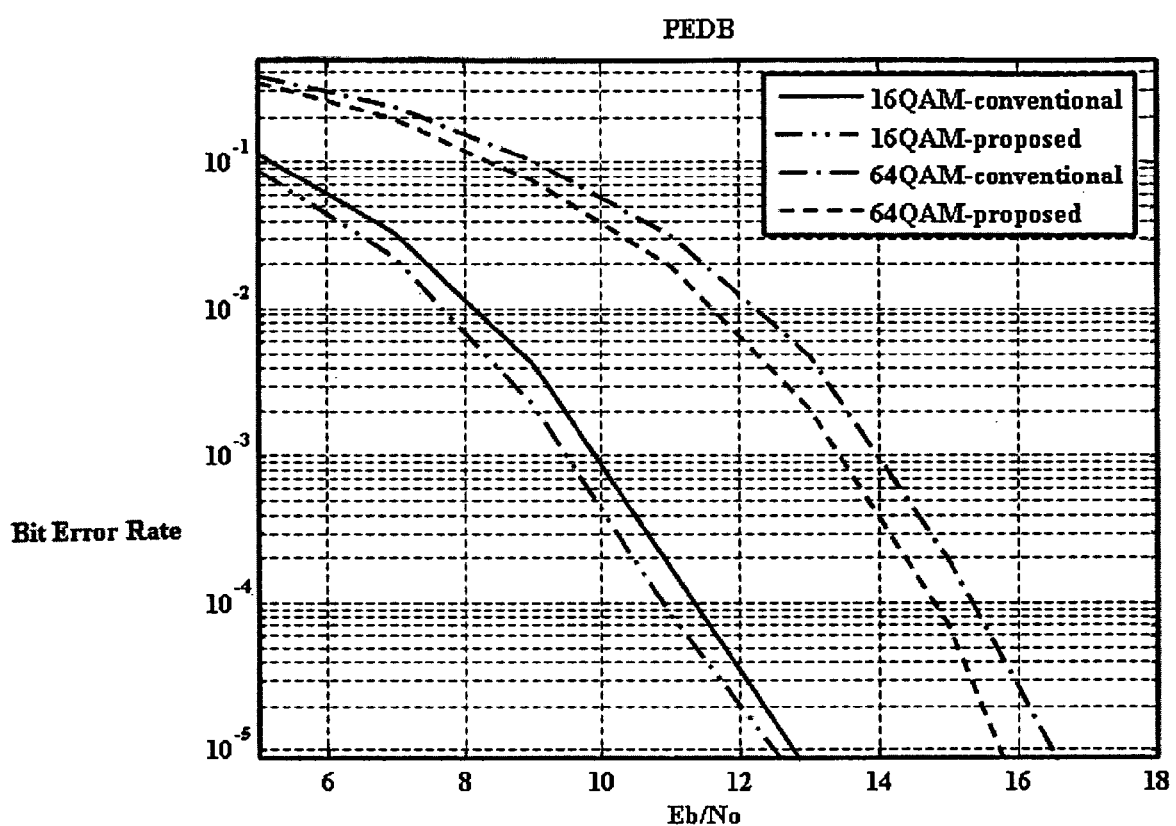
FIG. 11 is a graph illustrating a simulation result of a pedestrian-B system utilizing a likelihood metric calculation method according to an embodiment of the present invention.
Figure 12:
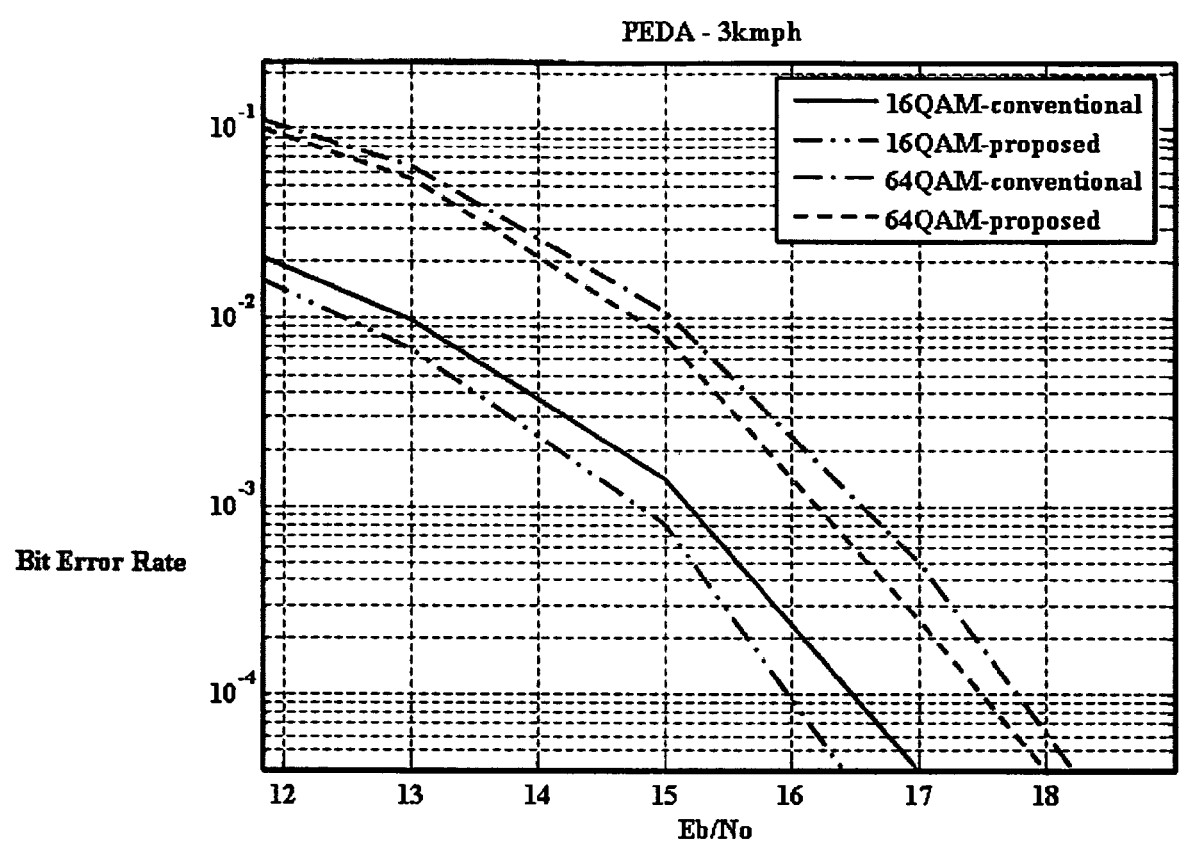
FIG. 12 is a graph illustrating a simulation result of a pedestrian-A system utilizing a likelihood metric calculation method and considering a physical movement of a receiving end according to an embodiment of the present invention.
Figure 13:
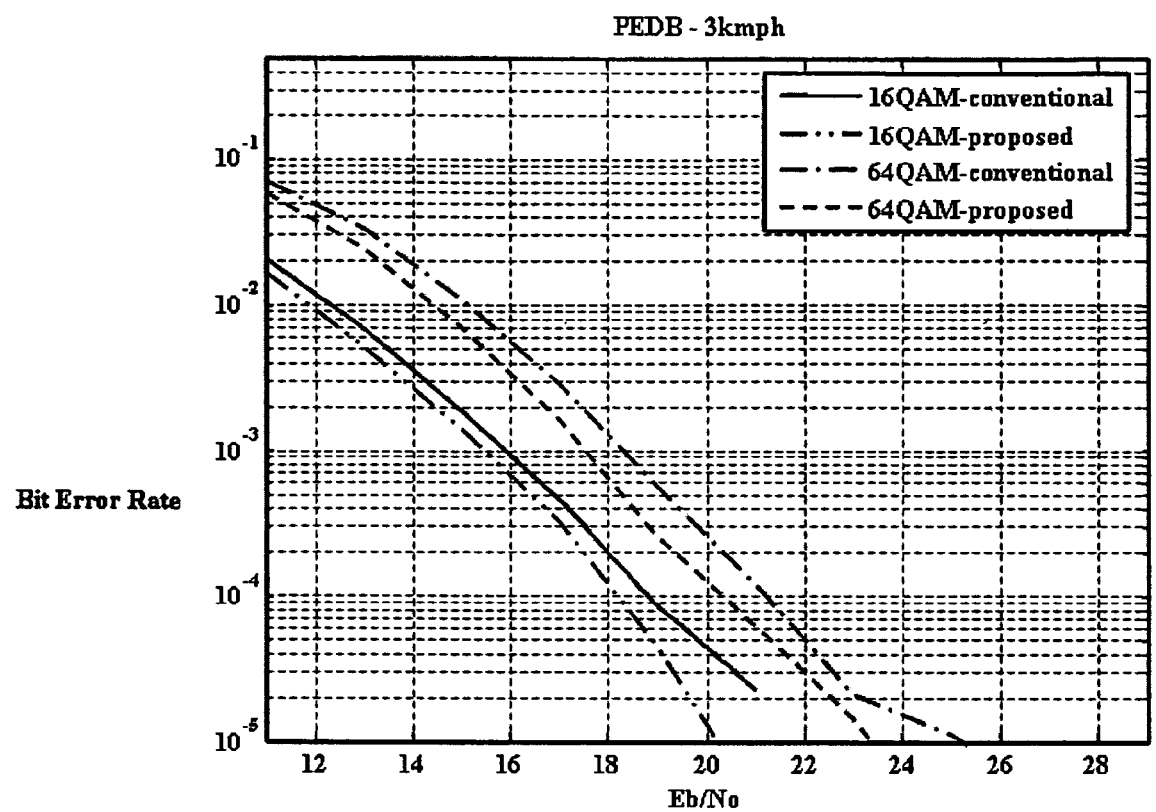
FIG. 13 is a graph illustrating a simulation result of a pedestrian-B system utilizing a likelihood metric calculation method and considering a physical movement of a receiving end according to an embodiment of the present invention.

The simulation is performed by Monte Carlo method, on the basis of a maximum 100 frames per simulation sample point ($E_b/N_0$). FIG. 10 is a performance comparison graph with respect to the pedestrian-A channel model environment, and FIG. 11 is a performance comparison graph with respect to the pedestrian-B channel model environment. FIGS. 12 and 13 are the results of simulations considering physical movement of a receiving end. In this instance, FIG. 12 shows results with respect to the pedestrian-A channel and FIG. 13 shows results with respect to the pedestrian-B channel. Also, 3 km/h is given for a movement speed and 2.4 GHz is utilized for a carrier frequency.

FIGS. 10 to 13 are graphs of a bit error rate (BER) to $E_b/N_0$ which is a major performance indicator of a digital communication system. The BER indicates a decoding performance when a received signal is decoded by using a likelihood metric calculated according to the likelihood metric calculation method and apparatus according to an embodiment of the present invention. The likelihood metric calculation performance may be compared by comparing BER when decoding is performed by an identical decoder. As illustrated in FIGS. 10 and 11, although there is a certain amount of difference, when the likelihood metric calculation method according to the present invention is utilized in the pedestrian-A channel and the pedestrian-B channel module environments with respect to a 16QAM signal and a 64QAM signal, BER is decreased faster than in the conventional likelihood metric calculation method. In particular, referring to simulation results of FIGS. 12 and 13 reflecting physical movement of the receiving end, a detection performance by the likelihood metric calculation method according to the present invention considering the effects by a channel variation is remarkably improved.

The likelihood metric calculation method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DYD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, when calculating a likelihood metric of a received signal in a digital communication system, a channel estimate is utilized. Accordingly, it is possible to reduce deterioration of the calculation performance according to a channel variation.

Also, according to the present invention, in a mobile communication or other wireless communication systems where a channel variation is serious, a likelihood metric of a received signal is more accurately calculated. Accordingly, it is possible to decrease a transmission error rate of the entire system and prevent a waste of resources which are needed to compensate for a transmission error.

Also, according to the present invention, when compensating a channel according to the channel estimate, a system complexity may be reduced by removing a dividing operation or a divider. Accordingly, a message detection speed and a system performance may be improved. Also, a receiving end may be more economically and efficiently constructed.

For this, a likelihood metric calculation method according to the present invention divides the operation of compensating a channel into using a complex conjugate of the channel estimate, and using a square component of the magnitude of the channel estimate. The first is included in the compensating of the channel and the second is included in the calculating of the likelihood metric for each bit. Accordingly, a calculation complexity may be reduced.

Also, according to the present invention, a comparison region is determined according to a location of a compensated received signal in a signal constellation. Only a likelihood, with respect to a major symbol coordinate, is calculated according to the determined comparison region. Accordingly, a likelihood metric may be simply calculated.

Also, according to the present invention, a new type of signal constellation in which a comparison region adaptively varies according to a channel estimate is utilized, not a signal constellation having a fixed symbol location. Accordingly, the accuracy of calculation may be improved.

Also, according to the present invention, a likelihood metric reflecting a channel characteristic, not a linear distance with a symbol location, is utilized. Accordingly, it is possible to more accurately reflect effects caused by a channel noise in the form of a Gaussian distribution.

Also, according to the present invention, it is possible to output a likelihood metric result according to a result of comparison with the region variable, and more accurately calculate the likelihood metric while not increasing the complexity of a system. In this instance, the likelihood metric calculation result is in the closed form of linear expression.

Also, according to the present invention, an appropriate weight is assigned to a calculation result by scaling a likelihood metric with a channel gain. Accordingly, a more accurate result will be outputted.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of calculating a likelihood metric of a received signal in a digital communication system, the method comprising:

in the digital communication system, estimating a channel of the received signal;

in the digital communication system, compensating a channel of the received signal according to a channel estimate to generate a compensated received signal;

in the digital communication system, calculating a region variable based on the channel estimate; and in the digital communication system, comparing the region variable and a magnitude of the compensated received signal and calculating a likelihood metric of the received signal according to a result of the comparison.

2. The method of claim 1, wherein the compensating a channel comprises multiplying the received signal and a complex conjugate of the channel estimate.

3. The method of claim 1, wherein the region variable is obtained by scaling a symbol coordinate value on a signal constellation corresponding to the received signal using the channel estimate.

4. The method of claim 3, wherein the scaling is performed by multiplying the symbol coordinate value by a square of a magnitude of the channel estimate.

5. The method of claim 1, wherein the step of comparing includes determining whether the magnitude of either a real or an imaginary part of the compensated received signal is larger or smaller than the region variable.

6. The method of claim 1, wherein the likelihood metric is a log likelihood ratio (LLR) which is calculated for each bit of a symbol.

7. The method of claim 1, wherein the digital communication system is an orthogonal frequency-division multiplexing (OFDM) or an orthogonal frequency division multiple access (OFDMA) system.

8. The method of claim 1, wherein the received signal is a quadrature amplitude multiplexed (QAM) signal.

9. The method of claim 8, wherein the QAM is a 16QAM and the region variable is determined by an integer multiple of a value $h_{sq}$ which is represented as, $$h_{sq} = \frac{|h_k|^2}{\sqrt{10}}$$

where $h_k$ is the channel estimate of the received signal with respect to a $k^{th}$ symbol.

10. The method of claim 9, wherein:

the region variable is $\pm 2h_{sq}$, and the comparing of the compensated received signal and the region variable and the calculating of the likelihood metric, when the compensated received signal is a signal with respect to a symbol represented as a grey code, and $0^{th}$ and $1^{st}$ bits of the compensated received signal constitute an imaginary axis coordinate and $2^{nd}$ and $3^{rd}$ bits of the compensated received signal constitute a real axis coordinate of the signal constellation, comprises:

calculating a likelihood metric of the $0^{th}$ bit as, $LLR_k(b_0)=2h_{sq}-r_{y,k};$ calculating a likelihood metric of the $1^{st}$ bit as, if $r_{y,k} \leq -2h_{sq}, LLR_k(b_1)=2(r_{y,k}+h_{sq})$, elseif $r_{y,k}>2h_{sq}, LLR_k(b_1)=2(r_{y,k}-h_{sq})$, and else $LLR_k(b_1)=r_{y,k};$ calculating a likelihood metric of the $2^{nd}$ bit as, $LLR_k(b_2)=2h_{sq}-r_{x,k};$ and calculating a likelihood metric of the $3^{rd}$ bit as, if $r_{x,k} \leq -2h_{sq}, LLR_k(b_3)=2(r_{x,k}+h_{sq})$, elseif $r_{x,k}>2h_{sq}, LLR_k(b_3)=2(r_{x,k}-h_{sq})$, and else $LLR_k(b_3)=r_{x,k}$, where $r_{x,k}=Re\{h_k^* y_k\}, r_{y,k} Im\{h_k^*\}$, and $y_k$ indicates a received signal with respect to a $k^{th}$ symbol, $b_n$ indicates an n, bit of the received signal, and $LLR_k(b_n)$ indicates an LLR with respect to the $n^{th}$ bit.

11. The method of claim 8, wherein the QAM is a 64QAM and the region variable is determined by an integer multiple of a value $h_{sq}$ which is represented as, $$h_{sq} = \frac{|h_k|^2}{\sqrt{42}}$$

where $h_k$ is the channel estimate of the compensated received signal with respect to a $k^{th}$ symbol.

12. The method of claim 11, wherein:

the region variable is any one of $0, \pm 2h_{sq}, \pm 4h_{sq}$, and $\pm 6h_{sq}$, and the comparing of the compensated received signal and the region variable and the calculating of the likelihood metric, when the compensated received signal is a signal with respect to a symbol represented as a grey code, and $0^{th}$, $1^{st}$ and $2^{nd}$ bits of the compensated received signal constitute an imaginary axis coordinate and $3^{rd}$, $4^{th}$ and $5^{th}$ bits of the compensated received signal constitute a real axis coordinate of the signal constellation, comprises:

calculating a likelihood metric of the $0^{th}$ bit as, if $r_{y,k} \leq -4h_{sq}, LLR_k(b_0)=r_{y,k}+6h_{sq}$, elseif $-4h_{sq}<r_{y,k}\leq 0, LLR_k(b_0)=-r_{y,k}-2h_{sq}$, elseif $0<r_{y,k}\leq 4h_{sq}, LLR_k(b_0)=r_{y,k}-2h_{sq}$, and else $LLR_k(b_0)=-r_{y,k}+6h_{sq};$ calculating a likelihood metric of the $1^{st}$ bit as, if $r_{y,k} \leq -6h_{sq}, LLR_k(b_1)=2(r_{y,k}+5h_{sq})$, elseif $-6h_{sq}<r_{y,k}\leq 2h_{sq}, LLR_k(b_1)=r_{y,k}+4h_{sq}$, elseif $-2h_{sq}<r_{y,k}\leq 0, LLR_k(b_1) 2(r_{y,k} 3h_{sq})$, elseif $0<r_{y,k}\leq 2h_{sq}, LLR_k(b_1)=-2(r_{y,k}-3h_{sq})$, elseif $2h_{sq}<r_{y,k}\leq 6h_{sq}, LLR_k(b_1)=-r_{y,k}+4h_{sq}$, and else $LLR_k(b_1)=-2(r_{y,k}-5h_{sq});$ calculating a likelihood metric of the $2^{nd}$ bit as, if $r_{y,k} \leq -6h_{sq}, LLR_k(b_2)=4(r_{y,k}+3h_{sq})$, elseif $-6h_{sq}<r_{y,k}\leq 4h_{sq}, LLR_k(b_2)=3(r_{y,k}+2h_{sq})$, elseif $-4h_{sq}<r_{y,k}\leq 2h_{sq}, LLR_k(b2)=2(r_{y,k}+h_{sq})$, elseif $-2h_{sq}<r_{y,k}\leq 2h_{sq}, LLR_k(b2)=r_{y,k}$, elseif $2h_{sq}<r_{y,k}\leq 4h_{sq}, LLR_k(b_2)=2(r_{y,k}-h_{sq})$, elseif $4h_{sq}<r_{y,k}\leq 6h_{sq}, LLR_k(b2)=3(r_{y,k}-2h_{sq})$, and else $LLR_{y,k}(b_2)=4(r_{y,k}-3h_{sq});$ and calculating a likelihood metric of the $3^{rd\ bit\ as}$, if $r_{x,k} \leq -4h_{sq}, LLR_k(b_3)=r_{y,k}+6h_{sq}$, elseif $-4h_{sq}<r_{x,k}\leq 0, LLR_k(b_3)=-r_{x,k}-2h_{sq}$, elseif $0<r_{x,k}\leq 4h_{sq}, LLR_k(b_3)=r_{x,k}-2h_{sq}$, else $LLR_k(b_3)=-r_{x,k}+6h_{sq};$ calculating a likelihood metric of the $4^{th}$ bit as, if $r_{x,k}-6h_{sq}, LLR_k(b_4)=2(r_{x,k}+5h_{sq})$, elseif $-6h_{sq}<r^{x,k}\leq -2h_{sq}, LLR_k(b_4)=r_{x,k}+4h_{sq}$, elseif $-2h_{sq}<r_{x,k}\leq 0, LLR_k(b_4)=2(r_{x,k}+3h_{sq})$, elseif $0<r_{x,k}\leq 2h_{sq}, LLR_k(b_4)=31\ 2(r_{x,k} 3h_{sq})$, elseif $2h_{sq}<r_{x,k}\leq 6h_{sq}, LLR_k(b_4)=-r_{x,k}-4h_{sq}$, and else $LLR_k(b_4)=<2(r_{x,k} 5h_{sq});$ and calculating a likelihood metric of the $5^{th}$ bit as, if $r_{x,k} \leq -6h_{sq}, LLR_k(b_5)=4(r_{x,k}+3h_{sq})$, elseif $-6h_{sq}<r_{x,k}\leq -4h_{sq}, LLR_k(b_5)=3(r_{x,k}+2h_{sq})$, elseif $-4h_{sq}<r_{x,k} 2h_{sq}, LLR_k(b_5)=2(r_{x,k} 30\ h_{sq})$, elseif $-2h_{sq}<r_{x,k} 2h_{sq}, LLR_k(b_5)=r_{x,k}$, elseif $2h_{sq}<r_{x,k}\leq 4h_{sq}, LLR_k(b_5)=2(r_{x,k}-h_{sq})$, elseif $4h_{sq}<r_{x,k}\leq 6h_{sq\ LLRk}(b_5)=3(r_{x,k}-2h_{sq})$, and else, $LLR_k(b_5)=4(r_{x,k}-3h_{sq})$, and where $r_{x,k}=Re\{h_k^* y_k\}, r_{y,k}=Im\{h_{k*} y_k\}$, and $y_k$ indicates a received signal with respect to a $k^{th}$ symbol, $b_n$ indicates an $n^{th}$ bit of the received signal, and $LLR_k(b_n)$ indicates an LLR with respect to the $n^{th}$ bit.

13. A computer readable record medium storing a program for implementing the method according to claim 1.

14. An apparatus for calculating a likelihood metric of a received signal in a digital communication system, the apparatus comprising:
- a channel estimation unit estimating a channel of the received signal;
- a channel compensation unit compensating a channel of the received signal according to a channel estimate to generate a compensated received signal;
- a region variable calculation unit calculating a region variable based on the channel estimate;
- a comparison unit comparing a magnitude of the compensated received signal and the region variable; and
- a bit metric calculation unit calculating a likelihood metric with respect to each bit of the compensated received signal according to a result of the comparison.

15. The apparatus of claim 14, wherein the channel compensation unit comprises:
- a conjugator calculating a complex conjugate of the channel estimate; and
- a multiplier multiplying the received signal and the complex conjugate of the channel estimate.

16. The apparatus of claim 14, wherein the region variable calculation unit comprises a multiplier multiplying a symbol coordinate value in a signal constellation corresponding to the received signal and a square of an absolute value of the channel estimate.

17. The apparatus of claim 14, further comprising:
- a maximum likelihood decoder decoding the received signal utilizing the calculated likelihood metric.

* * * * *

UNITED STATES PATENT AND TRADEMARK OFFICE
CERTIFICATE OF CORRECTION

PATENT NO. : 7,586,991 B2
APPLICATION NO. : 11/378792
DATED : September 8, 2009
INVENTOR(S) : Joonsang Choi It is certified that error appears in the above-identified patent and that said Letters Patent is hereby corrected as shown below:

In claim 10, Column 17, Line 31, replace "where $r_{x,k} = \text{Re}\{h_k^* y_k\}, r_{y,k} \text{Im}\{h_k^*\}$, and" with --where $r_{x,k} = \text{Re}\{h_k^* y_k\}, r_{y,k} = \text{Im}\{h_k^* y_k\}$, and--.

In claim 10, Column 17, Line 34, replace "indicates an n, bit of the received signal, and LLRk(b$_n$)" with --indicates an n$^{th}$ bit of the received signal, and LLR$_k$(b$_n$)--.

In claim 12, please replace a portion of the claim appearing in Column 18, from Line 1 starting with "calculating a likelihood metric of the 1$^{st}$ bit as . . ." to Line 65 ending with "with respect to the n$^{th}$ bit." with the following:
--calculating a likelihood metric of the 1$^{st}$ bit as, if $r_{y,k} \leq -6h_{sq}$, $LLR_k(b_1) = 2(r_{y,k} + 5h_{sq})$, elseif $-6h_{sq} < r_{y,k} \leq -2h_{sq}$, $LLR_k(b_1) = r_{y,k} + 4h_{sq}$, elseif $-2h_{sq} < r_{y,k} \leq 0$, $LLR_k(b_1) = 2(r_{y,k} + 3h_{sq})$, elseif $0 < r_{y,k} \leq 2h_{sq}$, $LLR_k(b_1) = -2(r_{y,k} - 3h_{sq})$, elseif $2h_{sq} < r_{y,k} \leq 6h_{sq}$, $LLR_k(b_1) = -r_{y,k} + 4h_{sq}$, and else $LLR_k(b_1) = -2(r_{y,k} - 5h_{sq})$;

UNITED STATES PATENT AND TRADEMARK OFFICE
CERTIFICATE OF CORRECTION

PATENT NO. : 7,586,991 B2
APPLICATION NO. : 11/378792
DATED : September 8, 2009
INVENTOR(S) : Joonsang Choi It is certified that error appears in the above-identified patent and that said Letters Patent is hereby corrected as shown below:

calculating a likelihood metric of the 2$^{nd}$ bit as, if $r_{y,k} \leq -6h_{sq}$, $LLR_k(b_2) = 4(r_{y,k} + 3h_{sq})$, elseif $-6h_{sq} < r_{y,k} \leq -4h_{sq}$, $LLR_k(b_2) = 3(r_{y,k} + 2h_{sq})$, elseif $-4h_{sq} < r_{y,k} \leq -2h_{sq}$, $LLR_k(b_2) = 2(r_{y,k} + h_{sq})$, elseif $-2h_{sq} < r_{y,k} \leq 2h_{sq}$, $LLR_k(b_2) = r_{y,k}$, elseif $2h_{sq} < r_{y,k} \leq 4h_{sq}$, $LLR_k(b_2) = 2(r_{y,k} - h_{sq})$, elseif $4h_{sq} < r_{y,k} \leq 6h_{sq}$, $LLR_k(b_2) = 3(r_{y,k} - 2h_{sq})$, and else $LLR_k(b_2) = 4(r_{y,k} - 3h_{sq})$; and calculating a likelihood metric of the 3$^{rd}$ bit as, if $r_{x,k} \leq -4h_{sq}$, $LLR_k(b_3) = r_{x,k} + 6h_{sq}$, elseif $-4h_{sq} < r_{x,k} \leq 0$, $LLR_k(b_3) = -r_{x,k} - 2h_{sq}$, elseif $0 < r_{x,k} \leq 4h_{sq}$, $LLR_k(b_3) = r_{x,k} - 2h_{sq}$, else $LLR_k(b_3) = -r_{x,k} + 6h_{sq}$;

calculating a likelihood metric of the 4$^{th}$ bit as, if $r_{x,k} \leq -6h_{sq}$, $LLR_k(b_4) = 2(r_{x,k} + 5h_{sq})$, elseif $-6h_{sq} < r_{x,k} \leq -2h_{sq}$, $LLR_k(b_4) = r_{x,k} + 4h_{sq}$, elseif $-2h_{sq} < r_{x,k} \leq 0$, $LLR_k(b_4) = 2(r_{x,k} + 3h_{sq})$, elseif $0 < r_{x,k} \leq 2h_{sq}$, $LLR_k(b_4) = -2(r_{x,k} - 3h_{sq})$, elseif $2h_{sq} < r_{x,k} \leq 6h_{sq}$, $LLR_k(b_4) = -r_{x,k} + 4h_{sq}$, and else $LLR_k(b_4) = -2(r_{x,k} - 5h_{sq})$; and

UNITED STATES PATENT AND TRADEMARK OFFICE
CERTIFICATE OF CORRECTION

PATENT NO. : 7,586,991 B2
APPLICATION NO. : 11/378792
DATED : September 8, 2009
INVENTOR(S) : Joonsang Choi It is certified that error appears in the above-identified patent and that said Letters Patent is hereby corrected as shown below:

calculating a likelihood metric of the 5$^{th}$ bit as, if $r_{x,k} \leq -6h_{sq}$, $LLR_k(b_5) = 4(r_{x,k} + 3h_{sq})$, elseif $-6h_{sq} < r_{x,k} \leq -4h_{sq}$, $LLR_k(b_5) = 3(r_{x,k} + 2h_{sq})$, elseif $-4h_{sq} < r_{x,k} \leq -2h_{sq}$, $LLR_k(b_5) = 2(r_{x,k} + h_{sq})$, elseif $-2h_{sq} < r_{x,k} \leq 2h_{sq}$, $LLR_k(b_5) = r_{x,k}$, elseif $2h_{sq} < r_{x,k} \leq 4h_{sq}$, $LLR_k(b_5) = 2(r_{x,k} - h_{sq})$, elseif $4h_{sq} < r_{x,k} \leq 6h_{sq}$, $LLR_k(b_5) = 3(r_{x,k} - 2h_{sq})$, and else, $LLR_k(b_5) = 4(r_{x,k} - 3h_{sq})$, and where $r_{x,k} = \text{Re}\{h_k^* y_k\}, r_{y,k} = \text{Im}\{h_k^* y_k\}$, and $y_k$ indicates a received signal with respect to a k$^{th}$ symbol,
$b_n$ indicates an n$^{th}$ bit of the received signal, and
$LLR_k(b_n)$ indicates an LLR with respect to the n$^{th}$ bit."--.

Signed and Sealed this

First Day of December, 2009

David J. Kappos
*Director of the United States Patent and Trademark Office*